United States Patent
Fang

(10) Patent No.: US 10,958,525 B2
(45) Date of Patent: Mar. 23, 2021

(54) NETWORK SLICE MANAGEMENT METHOD AND APPARATUS

(71) Applicant: HUAWEI TECHNOLOGIES CO., LTD., Guangdong (CN)

(72) Inventor: Haipeng Fang, Beijing (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 16/832,716

(22) Filed: Mar. 27, 2020

(65) Prior Publication Data

US 2020/0228405 A1 Jul. 16, 2020

Related U.S. Application Data

(63) Continuation of application No. PCT/CN2018/108264, filed on Sep. 28, 2018.

(30) Foreign Application Priority Data

Sep. 30, 2017 (CN) .......................... 201710928212.X

(51) Int. Cl.
*G06F 15/177* (2006.01)
*H04L 12/24* (2006.01)

(52) U.S. Cl.
CPC ...... *H04L 41/0893* (2013.01); *H04L 41/0806* (2013.01); *H04L 41/0843* (2013.01);
(Continued)

(58) Field of Classification Search
CPC ............. H04L 41/0893; H04L 41/0843; H04L 41/5051; H04L 41/5048; H04L 41/5054; H04L 41/12; H04L 41/0806; H04L 41/145
See application file for complete search history.

(56) References Cited

U.S. PATENT DOCUMENTS

2014/0331280 A1* 11/2014 Porras ..................... H04L 63/20
726/1
2016/0219078 A1* 7/2016 Porras ..................... H04L 41/12
(Continued)

FOREIGN PATENT DOCUMENTS

CN 106549806 A 3/2017
CN 106921977 A * 7/2017
(Continued)

OTHER PUBLICATIONS

XP051290419 3GPP TR 28.801 V1.0.0 (Mar. 2017),3rd Generation Partnership Project;Technical Specification Group Services and System Aspects;Telecommunication management;Study on management and orchestration of network slicing for next generation network (Release 14),total 52 pages.
(Continued)

*Primary Examiner* — Richard G Keehn
(74) *Attorney, Agent, or Firm* — Womble Bond Dickinson (US) LLP

(57) ABSTRACT

Embodiments of this application provide a network slice management method and an apparatus. The method includes: receiving, by an NSMF, a network slice instantiation request, where the network slice instantiation request includes network slice requirement information; obtaining, by the NSMF, a network slice template based on a network slice template identifier or a network slice type; decomposing, by the NSMF, the network slice requirement information into network slice subnet requirement information and transport network requirement information based on the network slice template; sending, by the NSMF, a network slice subnet instantiation request to an network slice subnet management function (NSSMF), where the network slice subnet instantiation request includes the network slice subnet requirement information; receiving, by the NSMF, a network slice subnet instantiation response sent by the NSSMF; and sending, by the NSMF, a transport network instantiation request to a TN-manager.

19 Claims, 9 Drawing Sheets

(52) U.S. Cl.
CPC ............ *H04L 41/12* (2013.01); *H04L 41/145* (2013.01); *H04L 41/5048* (2013.01); *H04L 41/5051* (2013.01); *H04L 41/5054* (2013.01)

(56) References Cited

U.S. PATENT DOCUMENTS

| | | |
|---|---|---|
| 2017/0070892 A1 | 3/2017 | Song et al. |
| 2017/0141973 A1 | 5/2017 | Vrzic |
| 2017/0332421 A1* | 11/2017 | Sternberg ............ H04L 41/0896 |

FOREIGN PATENT DOCUMENTS

| | | | | |
|---|---|---|---|---|
| CN | 106921977 A | 7/2017 | | |
| CN | 107094127 A | 8/2017 | | |
| CN | 107113195 A | 8/2017 | | |
| WO | 2016192643 A1 | 12/2016 | | |
| WO | 2017032280 A1 | 3/2017 | | |
| WO | WO-2017032280 A1 * | 3/2017 | ......... | H04L 41/5048 |
| WO | 2017080517 A1 | 5/2017 | | |

OTHER PUBLICATIONS

XP051269858 S5-173143 Huawei,"Editorial change for use case reorganization",3GPP TSG SA WG5 (Telecom Management) Meeting #113, May 8-12, 2017, West Palm Beach, Florida (US),total 9 pages.

XP051361889 S5-175119 Huawei,"pCR 28.531 Add use case and requirements of network slice instance creation",3GPP TSG SA WG5 (Telecom Management) Meeting #115, Oct. 16-20, 2017, Busan, Korea,total 3 pages.

XP051381147 S5-176124 Huawei,"pCR TS 28.531 Add specification level requirements",3GPP TSG SA WG5 (Telecom Management) Meeting #116, Nov. 27-Dec. 1, 2017, Reno, US,total 4 pages.

* cited by examiner

NETWORK SLICE MANAGEMENT METHOD AND APPARATUS

CROSS-REFERENCE TO RELATED APPLICATIONS

This application is a continuation of International Patent Application No. PCT/CN2018/108264, filed on Sep. 28, 2018, which claims priority to Chinese Patent Application No. 201710928212.X, filed on Sep. 30, 2017. The disclosures of the aforementioned applications are hereby incorporated by reference in their entireties.

TECHNICAL FIELD

Embodiments of this application relate to the field of communications technologies, and specifically, to a network slice management method and an apparatus.

BACKGROUND

As various communication services continuously emerge, requirements of different communication services on network performance differ significantly. A concept of a network slice (NS) is introduced into the 5th generation (5G) mobile communications system, to meet different requirements of different communication services on network performance.

Network slicing refers to customization of different logical networks on a physical or virtual network infrastructure based on different service requirements. A network slice may be a complete end-to-end network including a terminal device, an access network, a transport network, a core network, and an application server. The network slice can provide a complete communication service and has a network capability. The network slice may be alternatively any combination of a terminal device, an access network, a transport network, a core network, and an application server.

A network slice instance (NSI) is a real logical network that operates, and can meet a network feature or a service requirement. The network slice instance may be obtained through an instantiation by using a network slice template (NST). A complete network slice instance can provide a complete end-to-end network service, and the network slice instance may include several network slice subnet instances (NSSI) and/or several network functions (NF). The NSSI may be obtained through instantiation by using a network slice subnet template (NSST).

A network slice management process is as follows: A communication service management function (CSMF) receives a service requirement of a customer, converts the service requirement into a network slice requirement, and sends the network slice requirement to a network slice management function (NSMF); the NSMF converts the received network slice requirement into a network slice subnet requirement, and sends the network slice subnet requirement to a network slice subnet management function (NSSMF); the NSSMF converts the network slice subnet requirement into a network function requirement, and sends the network function requirement to a management and orchestration (MANO); and the MANO performs network service instantiation based on the network function requirement. Based on the management process, how to implement automatic management for a network slice is an urgent problem to be resolved.

SUMMARY

Embodiments of this application provide a network slice management method and an apparatus, so that network slice requirement information is decomposed by using a network slice template, to implement automatic management for a network slice.

A first aspect of the embodiments of this application provides a network slice management method, including:

receiving, by a network slice management function entity, a network slice instantiation request, where the network slice instantiation request includes network slice requirement information, and the network slice requirement information includes a network slice template identifier or a network slice type, and network slice deployment requirement information;

obtaining, by the network slice management function entity, a network slice template based on the network slice template identifier or the network slice type;

decomposing, by the network slice management function entity based on the network slice template, the network slice requirement information into network slice subnet requirement information of a network slice subnet included in the network slice template and transport network requirement information in the network slice;

for each network slice subnet included in the network slice, sending, by the network slice management function entity, a network slice subnet instantiation request to a network slice subnet management function entity, where the network slice subnet instantiation request includes the network slice subnet requirement information;

receiving, by the network slice management function entity, a network slice subnet instantiation response sent by the network slice subnet management function entity, where the network slice subnet instantiation response includes network slice subnet instantiation information, and the network slice subnet instantiation information includes a network slice subnet instance identifier, service access point instantiation information of a network slice subnet instance, and network connection point instantiation information of the network slice subnet instance;

sending, by the network slice management function entity, a transport network instantiation request to a transport network manager, where the transport network instantiation request includes the transport network requirement information in the network slice and network connection point information of all network slice subnet instances; and triggering, by the network slice management function entity, an establishment of a service connection of each network slice subnet instance based on service access point information obtained after an instantiation of each network slice subnet.

According to a second aspect, an embodiment of this application provides a network slice management function entity, including units or means (means) configured to perform the operations in the first aspect.

According to a third aspect, an embodiment of this application provides a network slice management function entity, including at least one processing element and at least one storage element, where the at least one storage element is configured to store a program and data, and the at least one processing element is configured to perform the method provided in the first aspect of this application.

According to a fourth aspect, an embodiment of this application provides a network slice management function entity, including at least one processing element (or chip) configured to perform the method in the first aspect.

According to a fifth aspect, an embodiment of this application provides a program, and the program is used to perform the method in the first aspect when being executed by a processor.

According to a sixth aspect, an embodiment of this application provides a program product, for example, a computer-readable storage medium, including the program in the fifth aspect.

It can be learned that in the first aspect to the sixth aspect, the network slice requirement information is decomposed by using the network slice template, so that automatic management for the network slice can be implemented.

In one embodiment, the network slice template includes a network slice subnet template identifier, a network connection point descriptor of a network slice subnet node, a service access point descriptor of the network slice subnet node, a network connection descriptor between network slice subnet nodes, and a service connection descriptor between the network slice subnet nodes.

The network connection point descriptor of the network slice subnet node is used to describe network connection point information of the network slice subnet node. The service access point descriptor of the network slice subnet node is used to describe service access point information of the network slice subnet node. The network connection descriptor between the network slice subnet nodes is used to describe network connection information between the network slice subnet nodes. The service connection descriptor between the network slice subnet nodes is used to describe service connection information between the network slice subnet nodes.

When the network slice instance includes a network slice subnet instance, content included in the network slice template is described, so that the network slice management function entity determines, based on the network slice requirement information, an input parameter required by each component.

In one embodiment, the network slice subnet template corresponding to the network slice subnet template identifier includes a node descriptor of a network function node included in the network slice subnet, a network connection point descriptor of the network function node, a service access point descriptor of the network function node, a network connection descriptor between network function nodes, and a service connection descriptor between the network function nodes. Defining component information required for network slice subnet instantiation means defining the content included in the network slice subnet template, so that the network slice subnet management function entity determines, based on the network slice subnet requirement information, the input parameter required by each component.

In one embodiment, the network slice template includes information required for network function subnet instantiation, a network connection point descriptor of the network function node, a service access point descriptor of the network function node, a network connection descriptor between the network function nodes, and a service connection descriptor between the network function nodes.

When the network slice instance includes a network function, content included in the network slice template is described, so that the network slice management function entity determines, based on the network slice requirement information, an input parameter required by each component.

In one embodiment, when the network slice instance includes a network function, the network slice template further includes a network service descriptor index file corresponding to a virtualized network function included in the network slice, and the network service descriptor index file is used for instantiating virtual resource deployment of the virtualized network function, so that the network slice management function entity generates an instantiation input parameter of a network service descriptor.

In one embodiment, when the network slice instance includes a network function, the network slice template further includes a service configuration file, and the service configuration file is used for service configuration of the network function, to implement a service function or some service functions.

In one embodiment, before the network slice management function entity sends the network slice subnet instantiation request to the network slice subnet management function entity, the network slice management function entity determines a deployment area of the network slice subnet instance based on the network slice requirement information. The network slice subnet instantiation request further includes the deployment area of the network slice subnet instance, so that a management and orchestration can subsequently deploy, in a data center in a correct area, a network function corresponding to the network slice subnet instance.

In one embodiment, the network slice subnet requirement information further includes the network slice subnet template identifier or the network slice type, so that the network slice subnet management function entity obtains the network slice subnet template.

In one embodiment, the network slice subnet instantiation request further includes a network slice instance identifier corresponding to a network slice.

In one embodiment, the network slice management function entity constructs a transport network instantiation request based on an instantiation response that is sent by each network slice subnet management function entity, and sends the transport network instantiation request to a transport network manager.

In one embodiment, the network slice management function entity sends a service access request to a corresponding network slice subnet management function entity based on service access point information obtained after instantiation of each network slice subnet, where the service access request includes a network slice instance identifier, a corresponding network slice subnet template identifier, and corresponding service access point information, and the service access request is used to trigger a corresponding network slice subnet association function entity to establish a service connection.

A seventh aspect of the embodiments of this application provides a network slice management method, including:

receiving, by a network slice subnet management function entity, a network slice subnet instantiation request, where the network slice subnet instantiation request includes network slice subnet requirement information;

obtaining, by the network slice subnet management function entity, a network slice subnet template;

decomposing, by the network slice subnet management function entity based on the network slice subnet template, the network slice subnet requirement information into network service requirement information of a network function included in the network slice subnet template, service configuration requirement information, and transport network requirement information in a network slice subnet;

sending, by the network slice subnet management function entity, a network slice subnet instantiation response to a network slice management function entity, where the network slice subnet instantiation response includes network slice subnet instantiation information, and the network slice subnet instantiation information includes a network slice subnet instance identifier, service access point instantiation information of a network slice subnet instance, and network connection point instantiation information of the network slice subnet instance;

sending, by the network slice subnet management function entity, a network service instantiation request to a management and orchestration, where the network service instantiation request includes the network service requirement information;

sending, by the network slice subnet management function entity, a service configuration request to an element management system corresponding to the network slice subnet management function entity, where the service configuration request includes the service configuration requirement information; and sending, by the network slice subnet management function entity, a transport network instantiation request to a transport network manager, where the transport network instantiation request includes the transport network requirement information in the network slice subnet.

According to an eighth aspect, an embodiment of this application provides a network slice subnet management function entity, including units or means (means) configured to perform the operations in the seventh aspect.

According to a ninth aspect, an embodiment of this application provides a network slice subnet management function entity, including at least one processing element and at least one storage element, where the at least one storage element is configured to store a program and data, and the at least one processing element is configured to perform the method provided in the seventh aspect of this application.

According to a tenth aspect, an embodiment of this application provides a network slice subnet management function entity, including at least one processing element (or chip) configured to perform the method in the seventh aspect.

According to an eleventh aspect, an embodiment of this application provides a program, where the program is used to perform the method in the seventh aspect when being executed by a processor.

According to a twelfth aspect, an embodiment of this application provides a program product, for example, a computer-readable storage medium, including the program in the eleventh aspect.

It can be learned that in the seventh aspect to the twelfth aspect, the network slice subnet requirement information is decomposed by using the network slice subnet template, so that automatic management for the network slice subnet can be implemented.

In one embodiment, the network slice subnet template includes a node descriptor of a network function node included in the network slice subnet, a network connection point descriptor of the network function node, a service access point descriptor of the network function node, a network connection descriptor between network function nodes, and a service connection descriptor between the network function nodes.

The node descriptor of the network function node is used to describe information required for network function subnet instantiation. The network connection point descriptor of the network function node is used to describe network connection point information of the network function node. The service access point descriptor of the network function node is used to describe service access point information of the network function node. The network connection descriptor between network function nodes is used to describe network connection information between the network function nodes. The service connection descriptor between the network function nodes is used to describe service connection information between the network function nodes.

Content included in the network slice subnet template is described, so that the network slice subnet management function entity determines, based on the network slice subnet requirement information, an input parameter required by each component.

In one embodiment, the network slice subnet template further includes a network service descriptor index file corresponding to a virtualized network function included in the network slice subnet, and the network service descriptor index file is used for instantiating virtual resource deployment of the virtualized network function.

In one embodiment, the network slice subnet template further includes a first network function configuration parameter information service configuration file, the first service configuration file is used for service deployment of the network function, and the first service configuration file is a non-service access point configuration file of the network slice subnet instance.

In one embodiment, when the network slice subnet template includes the network service descriptor index file corresponding to the virtualized network function included in the network slice subnet, the network slice subnet management function entity generates an instantiation input parameter of a network service descriptor based on input parameters of all components included in the network slice subnet template.

In one embodiment, when the network slice subnet template includes no network service descriptor index file corresponding to the virtualized network function included in the network slice subnet, the network slice subnet management function entity generates, based on input parameters of components included in the network slice subnet template, the network service descriptor file corresponding to the virtualized network function included in the network slice subnet instance.

In one embodiment, when the network slice subnet template includes a first network function configuration parameter information service configuration file, the network slice subnet management function entity generates an input parameter of the first service configuration file based on input parameters of components included in the network slice subnet template, where the first service configuration file is a non-service access point configuration file of the network slice subnet instance.

In one embodiment, when the network slice subnet template includes no first network function configuration parameter information service configuration file, the network slice subnet management function entity generates a first service configuration file based on input parameters of components included in the network slice subnet template, where the first service configuration file is used for service deployment of the network function, and the first service configuration file is a non-service access point configuration file of the network slice subnet instance.

In one embodiment, the network slice subnet management function entity obtains, based on the network slice subnet template, network connection point information of the network slice subnet instance and another network slice subnet instance and service access point information of the network slice subnet instance and the another network slice subnet instance.

In one embodiment, after sending a network slice subnet instantiation response to a network slice management function entity, the network slice subnet management function entity receives a service access request from the network slice management function entity. The service access request includes a network slice subnet template identifier, a network slice instance identifier, and service access point instantiation information. The service access point instantiation information includes local address information and peer address information of a service access point for interconnection between the network slice subnet instance and the another network slice subnet instance, and address information of a gateway router. The network slice subnet management function entity generates a second service configuration file based on the network slice subnet template and the service access point instantiation information, where the second service configuration file is a service configuration file used for interconnection between the network slice subnet instance and another network slice subnet instance.

In one embodiment, the network slice subnet instantiation request further includes a deployment area of the network slice subnet instance, and the network service instantiation request further includes the deployment area of the network slice subnet instance.

In one embodiment, the network slice subnet requirement information includes the network slice subnet template identifier or the network slice type, so that the network slice subnet management function entity obtains the network slice subnet template based on the network slice subnet template identifier or the network slice type.

A thirteenth aspect of the embodiments of this application provides a network slice management method, including:

receiving, by a management and orchestration, a transport network instantiation request, where the transport network instantiation request includes transport network requirement information;

performing, by the management and orchestration, transport network instantiation based on the transport network requirement information; and sending, by the management and orchestration, a transport network instantiation response.

According to a fourteenth aspect, an embodiment of this application provides a management and orchestration, including units or means (means) configured to perform the operations in the thirteenth aspect.

According to a fifteenth aspect, an embodiment of this application provides a management and orchestration, including at least one processing element and at least one storage element, where the at least one storage element is configured to store a program and data, and the at least one processing element is configured to perform the method provided in the thirteenth aspect of this application.

According to a sixteenth aspect, an embodiment of this application provides a management and orchestration, including at least one processing element (or chip) configured to perform the method in the thirteenth aspect.

According to a seventeenth aspect, an embodiment of this application provides a program, where the program is used to perform the method in the thirteenth aspect when being executed by a processor.

According to an eighteenth aspect, an embodiment of this application provides a program product, for example, a computer-readable storage medium, including the program in the seventeenth aspect.

It can be learned that in the thirteenth aspect to the eighteenth aspect, the management and orchestration may perform transport network instantiation based on the received transport network requirement information, so that both instantiation of a transport network including a network slice subnet instance included in the network slice instance and instantiation of a transport network including a network function included in the network slice subnet instance can be implemented.

An embodiment of this application further provides a network slice management system, including a network slice management function entity, a network slice subnet management function entity, and a transport network manager.

BRIEF DESCRIPTION OF DRAWINGS

To describe technical solutions in embodiments of this application or in the background more clearly, the following briefly describes the accompanying drawings required for describing the embodiments of this application or the background.

DESCRIPTION OF EMBODIMENTS

Figure 1:
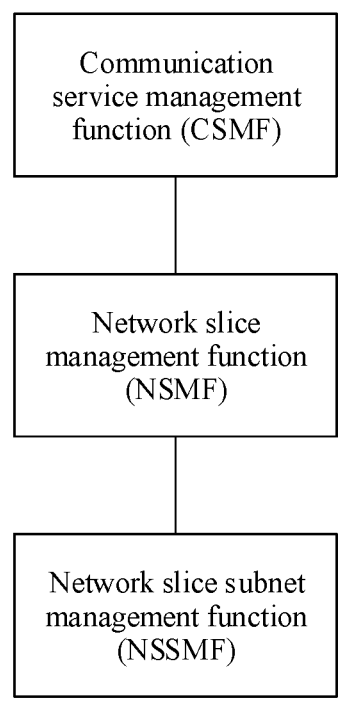
FIG. 1 is a schematic diagram of a network architecture to which an embodiment of this application is applied.

In 5G, diversified service requirements have different requirements on a rate, performance, security, reliability, and a latency of a network. For example, in an enhanced mobile broadband (eMBB) scenario (for example, a virtual reality scenario or an augmented reality scenario), a bandwidth requirement is relatively high and an xGbps-level bandwidth is required. For another example, in a massive machine type communication (mMTC) scenario (for example, a wearable scenario or a smart grid scenario), massive device access needs to be supported, for example, access by hundreds of millions of devices or access by billions of devices needs to be supported. For another example, in an ultra-reliable and low-latency (uRLLC) scenario (for example, a self-driving scenario, a remote surgery scenario, or an industrial control scenario), an ultra-low latency of 1 ms needs to be supported. Network slicing emerges to meet requirements of different scenarios, different requirements, and ultimate experience. Networks with different features can be flexibly constructed based on 5G scenarios and requirements.

A network slicing technology is to logically abstract a network as one or more network slices isolated from each other, and each network slice includes a series of logical network functions, to pertinently meet differentiated requirements of different service types.

The network slicing technology is to abstract, based on a scenario requirement, a physical infrastructure resource of a 5G network as a plurality of parallel network slice instances independent of each other. In each network slice instance, based on a service scenario requirement and a service model, a network function is customized and tailored, and a corresponding network function is orchestrated and managed. One network slice instance may be considered as one instantiated 5G network. According to such a network structure, an operator is allowed to provide a network as a service for a user, and can freely combine entity networks based on indicators such as a rate, a capacity, coverage, a latency, reliability, security, and availability, to meet requirements of different users.

Different network slices may provide different network functions. For example, for a scenario in which a mobile intelligent terminal (for example, a mobile phone) performs communication, an independent network slice may be used. For another example, in an internet of vehicles scenario, because there is an ultra-low latency requirement mainly for a self-driving service, and there is a relatively high requirement on a network processing latency and reliability, an independent network slice may also be used. For another example, in an mMTC scenario, because there is a relatively large quantity of access devices, but a packet sent by the access device is relatively small, and a requirement on a network latency is relatively low, an independent network slice may also be used. Because different network slices need to provide different functions and different service quality requirements, different network functions may be deployed in different network slices.

Terms or names used in the embodiments of this application are described below.

A network slice is a logically isolated network that is deployed on a physical or virtual infrastructure and that is used to support a specific network capability and a specific network feature.

The network slice may include a complete end-to-end (E2E) network including an access network, a transport network, a core network, and an application server. Some network functions may also be shared by a plurality of network slices. The network slice is a key technology that meets differentiated network requirements of a 5th generation (5G) mobile communications technology proposed by the 3rd generation partnership project (3GPP). Usually, different network slices have different network features, and the network slices are required to be isolated from each other and cause no impact to each other. For example, a network slice for an augmented reality (AR) service or a virtual reality (VR) service requires a high bandwidth and a low latency. A network slice for an internet of things (IoT) service requires support of access by massive terminals, but requires a low bandwidth and has no requirement on a latency. The network slice may be alternatively any combination of a terminal device, an access network, a transport network, a core network, and an application server.

A network slice instance is a real logical network that operates, and can meet a network feature or a service requirement. A network slice instance may provide one or more network services. The network slice instance may be created by a network slice management system. One network slice management system may create a plurality of network slice instances and centrally manage the network slice instances. The network slice instance may be created by using a network slice template.

A network slice template (NST) is used to create a network slice instance.

A complete network slice instance can provide a complete end-to-end network service, and the network slice instance may include a network slice subnet instance and/or a network function. The network slice subnet instance may not need to provide a complete end-to-end network service. The network slice subnet instance may be a set of network functions of a same equipment vendor in the network slice instance, or may be a set of network functions classified based on domains, for example, a network slice subnet instance of a core network and a network slice subnet instance of an access network. A network slice subnet instance may be shared by a plurality of network slice instances. One network slice instance may include a plurality of network slice subnet instances, and each network slice subnet instance includes a plurality of network functions and/or other network slice subnet instances. One network slice instance may directly include several network slice subnet instances and a network function that is not classified into a network slice subnet instance. One network slice instance may alternatively include only several network functions.

A network slice subnet template (NSST) is used to create a network slice subnet instance.

A network function means a network service that is provided, and defines functional behavior and an interface. For example, in a 5G network, a network function may include a session management function (SMF), a policy control function (PCF), a user plane function (UPF), an evolved NodeB (eNB) or a 5G base station (new radio (NR) NodeB, gNB), an access and mobility management function ( ), a network repository function (NRF), or the like. The SMF is configured to provide a session management service. The PCF is configured to provide a policy control service. The UPF is configured to provide a user plane service. The AMF is configured to provide an access and mobility management service. The eNB or the gNB (where the eNB is used as an example for description below) is configured to provide a radio access service. The NRF is configured to provide service discovery. A network function may be implemented by special-purpose hardware, or may be implemented by running software on special-purpose hardware, or may be implemented in a form of a virtual function on a general-purpose hardware platform. Therefore, from a perspective of implementation, network functions may be classified into a physical network function (PNF) and a virtualized network function (VNF). From a perspective of usage, network functions may be classified into a dedicated network function and a shared network function. Specifically, a plurality of (sub) network slice instances may independently use different network functions, and such network functions are referred to as dedicated network functions; or a plurality of (sub) network slice instances may share a same network function, and such a network function is referred to as a shared network function. The physical network function and/or the virtual network function are/is collectively referred to as a network function below.

A network functions virtualization infrastructure (NFVI) is a resource pool from a perspective of cloud computing. Mapping an NFVI to a physical infrastructure means connecting of a plurality of geographically dispersed data centers (DC) through a high-speed communications network. The NFVI needs to convert physical computing/storage/switching resources into virtual computing/storage/switching resource pools through virtualization.

A management and orchestration (MANO) is responsible for management and orchestration of entire NFVI resources, is responsible for mapping and association between a service network and an NFVI resource, and is responsible for implementing a service resource procedure of an operations support system (OSS).

For instantiation and deployment of a network slice and a network slice subnet, the MANO needs to complete instantiation of a network service (NS). The instantiation of the network service is to mainly apply to the NFVI for a virtual resource required for the instantiation of the network slice or the network slice subnet.

A network service descriptor (NSD) is used to describe a network topology and required resource information that are used for instantiating a network service. The MANO may instantiate a network service based on the NSD.

An element management system (EMS) is an element management system of a network function, and is configured to deliver service configuration of the network function to the network function.

FIG. 1 is a schematic diagram of a network architecture to which an embodiment of this application is applied. The network architecture includes a communication service management function (CSMF), a network slice management function (NSMF), and a network slice subnet management function (NSSMF). It should be noted that quantities of CSMFs, NSMFs, and NSSMFs included in the network architecture are not limited to those shown in FIG. 1. In actual application, there may be a plurality of CSMFs, a plurality of NSMFs, and a plurality of NSSMFs. It should be noted that the foregoing three management functions may be described by using other names. This is not limited in this embodiment of this application. According to the solution provided in this embodiment of this application, an operator may provide a network slice instance for a user, to provide a specific communication service, for example, a high-definition video, for the user.

Specifically, the user may determine, through negotiation with the operator, corresponding communication service requirements, for example, a coverage range required by a network service, a user quantity, user distribution, a mobility requirement, a latency requirement, and whether a network slice needs to be isolated from another network slice.

The CSMF is mainly responsible for converting a communication service requirement of an operator and/or a third-party customer into network slice requirement information, where the network slice requirement information includes a network slice type/slice template identifier ID and network slice deployment requirement information (for example, a network capacity and a quality of service QoS requirement); sending the network slice requirement information to the NSMF through an interface between the CSMF and the NSMF; obtaining management data (for example, performance data and fault data) of a network slice from the NSMF; generating management data of a communication service running on the network slice instance; and receiving a subscription requirement of the operator and/or the third-party customer for the management data of the network slice and/or the management data of the communication service.

The NSMF is mainly responsible for receiving the network slice requirement information sent by the CSMF; managing a life cycle, performance, a fault, and the like of a network slice instance (where the management of the life cycle, the performance, the fault is referred to as management below); orchestrating composition of the network slice instance; decomposing the network slice requirement information into requirement information of each network slice subnet instance and/or network function, and a transport network (TN) requirement; and sending a network slice subnet instantiation request to each NSSMF, and sending the transport network requirement to a transport network manager (TN-manager).

The NSSMF is mainly responsible for receiving the network slice subnet requirement sent by the NSMF; managing a network slice subnet instance; orchestrating composition of the network slice subnet instance; decomposing a requirement of the network slice subnet instance into a requirement of each network function and/or nested network slice subnet instance; and sending a nested network slice subnet instantiation request to another NSSMF, and managing a nested network slice subnet instance and the like.

It should be noted that a network function management entity, network function management, and an NSMF are interchangeable in the embodiments of this application. The three terms are all used to describe an entity responsible for receiving a network slice requirement sent by the CSMF, and do not constitute any limitation on the embodiments of this application. This is also applied to the NSSMF and the CSMF.

Based on the current network slice management process, how to implement automatic management for a network slice is an urgent problem to be resolved. In view of this, the embodiments of this application provide a network slice management method and an apparatus, so that network slice requirement information is decomposed by using a network slice template, to implement automatic management for a network slice.

Figure 2A:
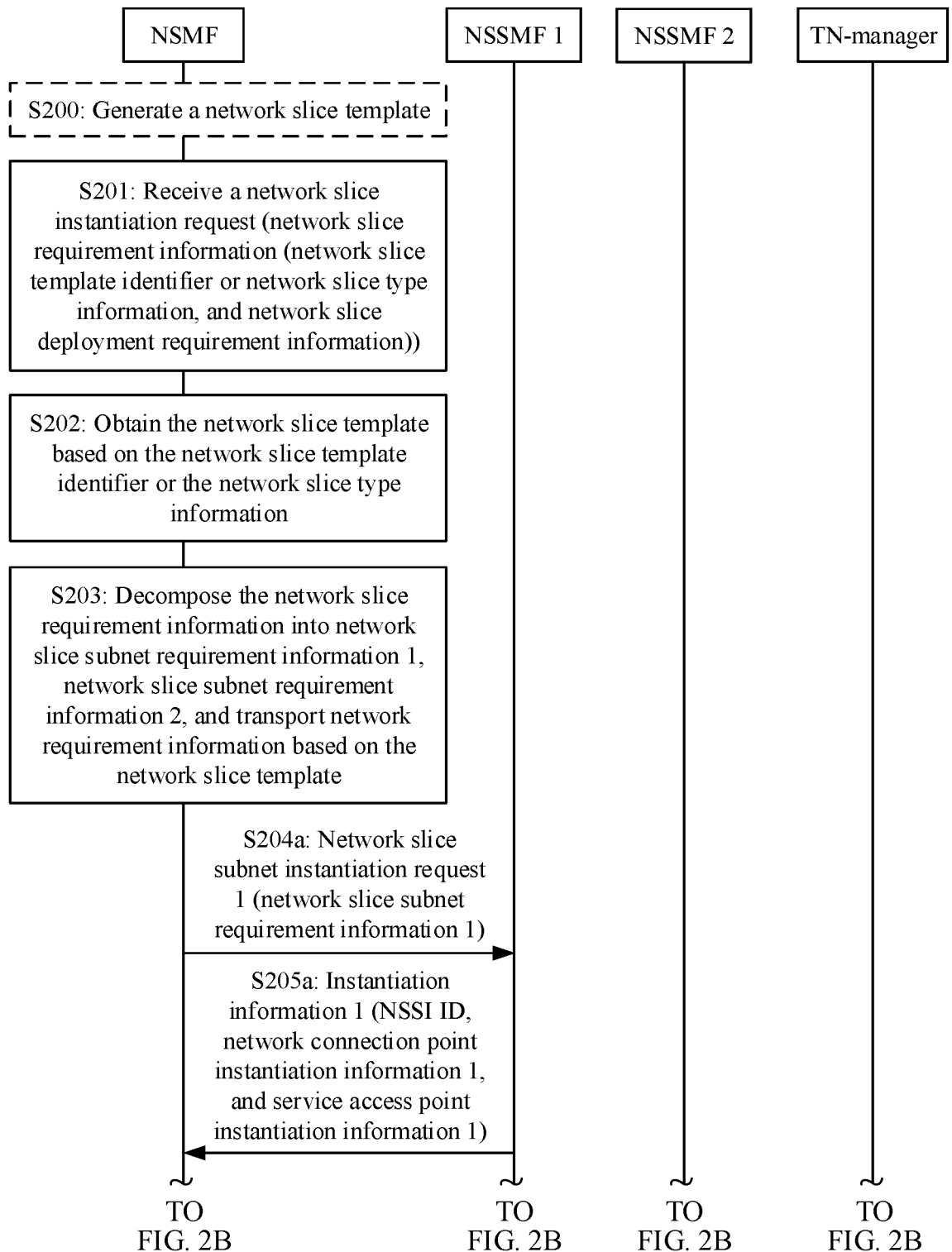
FIG. 2A and FIG. 2B are a flowchart of a network slice management method according to an embodiment of this application.
Figure 2B:
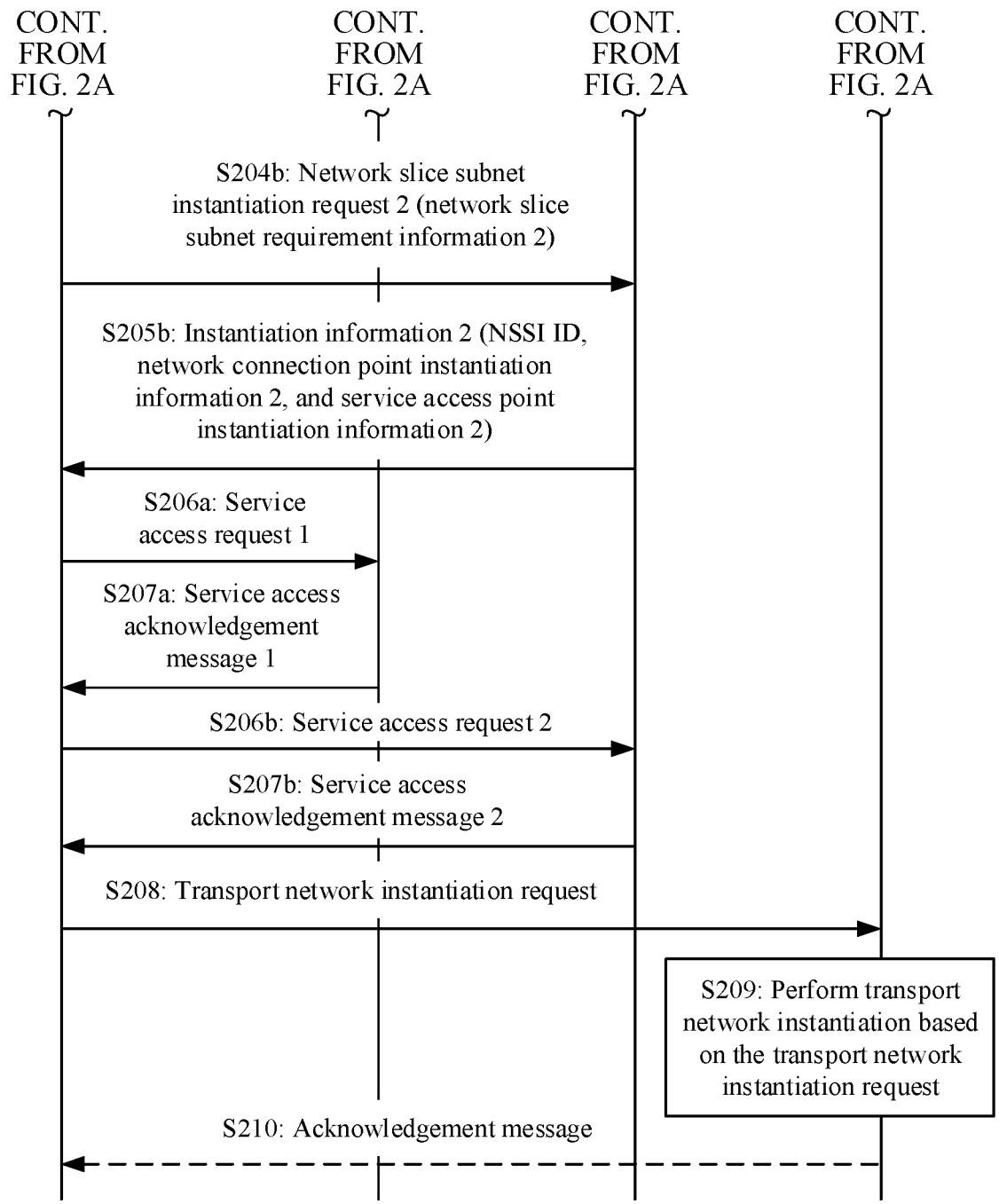

FIG. 2A and FIG. 2B are a schematic flowchart of a network slice management method according to an embodiment of this application. The method is described from a perspective of interaction between an NSMF, an NSSMF, and a TN-manager. The TN-manager is responsible for instantiation management of transport networks between network slice subnet nodes and between different network functions in a network slice subnet node. In the method shown in FIG. 2A and FIG. 2B, an example in which a network slice instance includes two network slice subnet instances, an NSSMF 1 may be instantiated to obtain a network slice subnet instance 1 (NSSI-1), and an NSSMF 2 may be instantiated to obtain a network slice subnet instance 2 (NSSI-2) is used. The method shown in FIG. 2A and FIG. 2B may include but is not limited to the following operations.

Operation S200: Generate a network slice template.

Before the NSMF receives a network slice instantiation request, a slice designer (for example, a slice provider) designs a network slice template, generates the network slice template, and on-boards (on-boarding) the network slice template to the NSMF. The NSMF may record and store a correspondence between a network slice template and network slice requirement information, where the network slice requirement information includes a network slice subnet template identifier or a network slice type. The network slice type is used to represent a type of a network service provided by a slice, for example, a high-definition video service type or an internet of vehicles type. On-boarding the network slice template to the NSMF is a precondition for implementation of this embodiment of this application.

Figure 3:
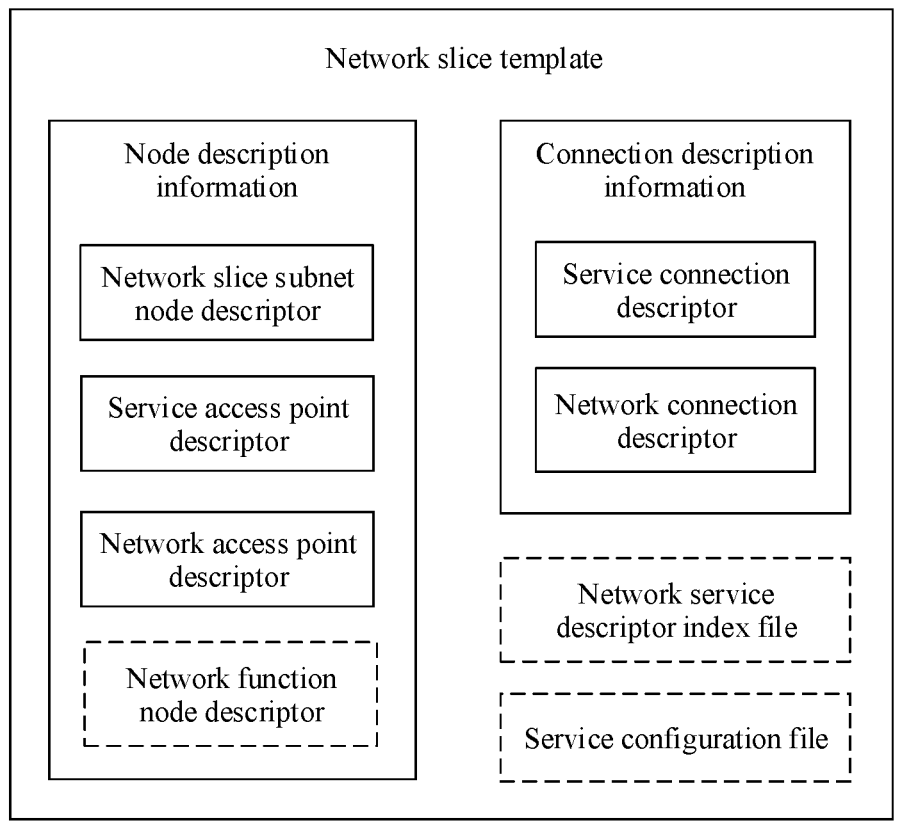
FIG. 3 is a schematic composition diagram of a network slice template according to an embodiment of this application.

For a schematic composition diagram of the network slice template, refer to FIG. 3. The network slice template is used to describe component information required for network slice instantiation, where the information includes node description information of a node included in a network slice and connection description information between nodes. The node may be a network slice subnet node or a network function node.

When the network slice instance includes a network slice subnet instance, the node description information includes a network slice subnet node descriptor (NSS node descriptor), a network connection point descriptor (network connection point descriptor) of a network slice subnet node, and a service access point descriptor (service access point descriptor) of the network slice subnet node; and the connection description information includes a service connection descriptor (service connection descriptor) between network slice subnet nodes and a network connection descriptor (network connection descriptor) between the network slice subnet nodes.

When the network slice instance may include a network function, the node description information includes a network function node descriptor (NF node descriptor), a network connection point descriptor of a network function node, and a service access point descriptor of the network function node; and the connection description information includes a network connection descriptor between different network function nodes and a service connection descriptor between the network function nodes. The network function node may be a virtualized network function node (VNF node) or may be a physical network function node (PNF node).

Assuming that a network slice includes two network slice subnets, nodes corresponding to the two network slice subnets are an access network (AN) node and a core network (CN) node, and there are a network connection and a service connection between the access network node (AN node) and the core network node (CN node). The network connection is used to describe a physical connection between the two nodes, that is, the two nodes are physically connected. If service interaction (for example, mutual service packet transmission) between the two nodes needs to be implemented, the service connection needs to be implemented.

Figure 4:
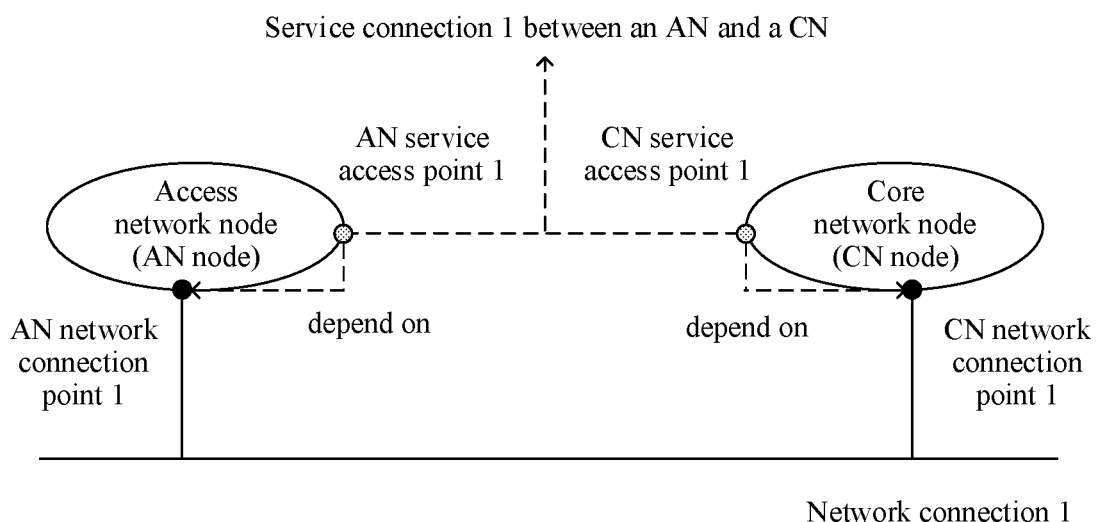
FIG. 4 is a schematic diagram of a network connection and a service connection according to an embodiment of this application.

FIG. 4 is a schematic diagram of the network connection and the service connection based on this assumption. Gray points on the nodes are service access points, and black points are network connection points. A network connection point 1 of the AN node is connected to a network connection point 1 of the CN node by using a solid line, indicating that a network connection exists between the AN node and the CN node. To be specific, the solid line shown in FIG. 4 indicates the network connection between the AN node and the CN node, and the network connection is used to carry network connection information between an AN and a CN. A service access point 1 of the AN node is connected to a service access point 1 of the CN node by using a long dashed line, indicating that a service connection exists between the AN node and the CN node. To be specific, the long dashed line shown in FIG. 4 indicates the service connection between the AN node and the CN node, and the service connection is used to carry service interworking information between the AN and the CN.

The service access point of the AN node depends on the network connection point of the AN node, and the service access point of the CN node depends on the network connection point of the CN node. It should be noted that there are one network connection point and one service access point on one node shown in FIG. 4, and this does not constitute any limitation on this embodiment of this application. In actual application, there are a plurality of network connection points and a plurality of service access points on one node.

A network connection point of a node may perform a network connection to a network connection point of another node. In other words, a network connection point of a network slice subnet node may perform a network connection to a network connection point of another network slice subnet node, or may perform a network connection to a network connection point of an application server or application software.

In one embodiment, different nodes in a network slice instance may be connected to a connected network by using a network connection point, to implement a network connection between the nodes.

A service access point of a node may perform a service connection to a service access point of another node. In other words, a service access point of a network slice subnet node may perform a service connection to a service access point of another network slice subnet node, or may perform a service connection to a service access point of an application server or application software.

The network slice subnet node descriptor includes component information required for network slice subnet instantiation. The component information required for network slice subnet instantiation includes a node descriptor of a network function node included in a network slice subnet, a network connection point descriptor of the network function node, a service access point descriptor of the network function node, a network connection descriptor between network function nodes, and a service connection descriptor between the network function nodes. It may be understood that the network slice subnet node descriptor is used to describe information required for network slice subnet instantiation.

The service connection descriptor between the network slice subnet nodes is used to describe service connection information between the AN node and the CN node in FIG. 4, that is, used to describe service connection information between the network slice subnet nodes. The service connection information may include information such as a service connection protocol and a service connection-related parameter. It may be understood that the service connection descriptor between the network slice subnet nodes is used to describe information, such as a specific service connection protocol and a specific service connection-related parameter, used for a service connection between the network slice subnet nodes.

The network connection descriptor between the network slice subnet nodes is used to describe network connection information between the AN node and the CN node in FIG. 4, that is, used to describe network connection information between the network slice subnet nodes. The network connection information may include information such as quality of service (QoS) information and an internet protocol (IP) type that are of a network plane. It may be understood that the network connection descriptor between the network slice subnet nodes is used to describe specific network connection information used for a network connection between the network slice subnet nodes.

The service access point descriptor of the network slice subnet node is used to describe service access point information of the network slice subnet node. The service access point information may be information about a service access point for performing a service connection between the network slice subnet node and a device outside a network slice, or may be information about a service access point for performing a service connection between the network slice subnet node and an application server or application software. The service access point information may include information such as a service IP address of the service access point. If there are a plurality of service access points on the network slice subnet node, each service access point may correspond to one service access point descriptor.

The network connection point descriptor of the network slice subnet node is used to describe network connection point information of the network slice subnet node. The network connection point information may be information about a network connection point for a network connection between the network slice subnet node and another network slice subnet node, or may be information about a network connection point for a network connection between the network slice subnet node and a device outside a network slice. The network connection point information may include information such as a physical IP address of the network connection point. If there are a plurality of network connection points on the network slice subnet node, each network connection point may correspond to one network connection point descriptor.

The network slice subnet node is a node of a network slice subnet included in the network slice.

The physical IP address may be understood as an IP address of a physical interface, and the service IP address is an IP address for service interaction with another network element. However, a service IP packet needs to be sent from the physical interface.

It may be understood that in the scenario in which the network slice instance includes a network slice subnet instance, the node description information includes the component information required for network slice subnet instantiation, the network connection point descriptor of the network slice subnet node, and the service access point descriptor of the network slice subnet node; and the connection description information includes the network connection descriptor between the network slice subnet nodes and the service connection descriptor between the network slice subnet nodes.

In the scenario in which the network slice instance may include a network function, the node description information may include the network function node descriptor shown in a dashed-line block in FIG. 3, the network connection point descriptor of the network function node, and the service access point descriptor of the network function node; and the connection description information may include the network connection descriptor between the network function nodes and a service descriptor between the network function nodes. The network function node descriptor is used to describe information required for network function subnet instantiation. The network connection point descriptor of the network function node, the service access point descriptor of the network function node, the network connection descriptor between the network function nodes, and the service access point descriptor between the network function nodes are respectively similar to the network connection point descriptor of the network slice subnet node, the service access point descriptor of the network slice subnet node, the network connection descriptor between the network slice subnet nodes, and the service access point descriptor between the network slice subnet nodes. Details are not described herein again.

In the scenario in which the network slice instance may include a network function, the network slice template may include a service configuration file shown in a dashed-line block in FIG. 3, and the service configuration file is used for service configuration of the network function. It may be understood that the service configuration file indicates specific service functions that need to be implemented by the network function.

If the network slice instance may include a virtualized network function, the network slice template may include a network service descriptor (NSD) index file shown in a dashed-line block in FIG. 3, and may be an NSD ID. The network service descriptor is used for instantiating virtual resource deployment of an associated network function, and the associated network function is a virtual network function included in the network slice. It may be understood that, a MANO may complete the virtual resource deployment of the associated network function based on the NSD file corresponding to a network service descriptor ID index in this case. The virtual resource may include a virtual memory resource, a virtual central processing unit (CPU), and the like.

Operation S201: The NSMF receives a network slice instantiation request, where the network slice instantiation request includes the network slice requirement information, and the network slice requirement information includes a network slice template identifier or the network slice type.

A network slice subscriber, for example, an operator or a third-party customer, may subscribe to a network slice in an operational interface of a business support system (BSS), that is, enter a service requirement in the operational interface of the BSS. The service requirement may include a service type, and may further include a service-level agreement (SLA) requirement. The SLA is a contract between a network service provider and a customer. The SLA requirement may include a user quantity, a bandwidth requirement, a latency assurance requirement, and the like. It may be understood that the service requirement includes the service type and the SLA requirement.

When receiving the service requirement, a CSMF (or a BSS-CSMF) converts the service requirement into the network slice requirement information, where the conversion specifically includes service type conversion and SLA requirement conversion. The service type conversion means conversion of a service type in a service requirement into a network slice type, for example, conversion of a service type into an eMBB network slice, an uRLLC network slice, or an mMTC network slice. In one embodiment, in this case, the CSMF may further search for, based on the network slice type, the network slice template identifier (NST ID) corresponding to the network slice type. The SLA requirement conversion means conversion of an SLA requirement into network slice deployment requirement information. The network slice deployment requirement information may include requirements such as a user quantity, a bandwidth, and a latency. In other words, the network slice deployment requirement information is used to describe requirement information such as the user quantity, the bandwidth, and the latency.

It may be understood that the network slice requirement information includes the network slice type and the network slice deployment requirement information, the network slice type is used to indicate a type of a network slice, and the network slice template identifier may be determined based on the network slice type. Alternatively, the network slice requirement information includes the network slice template identifier and the network slice deployment requirement information, and the network slice template identifier is used to indicate a network slice template.

It may be understood that the network slice requirement information may provide an input parameter for network slice instantiation.

The CSMF sends the network slice instantiation request to the NSMF, where the network slice instantiation request includes the network slice requirement information, and the network slice requirement information includes the network slice template identifier or the network slice type, and the network slice deployment requirement information. Correspondingly, the NSMF receives the network slice instantiation request from the CSMF, where the network slice instantiation request may be an initial instantiation request, to be specific, a network slice instance that does not exist in a current system may be requested to be instantiated.

Operation S202: The NSMF obtains the network slice template based on the network slice template identifier or the network slice type.

In one embodiment, the NSMF obtains, based on the network slice template identifier, the network slice template corresponding to the network slice template identifier. One network slice template identifier corresponds to one network slice template.

In one embodiment, the NSMF obtains, based on the network slice type, the network slice template corresponding to the network slice type. One network slice type corresponds to one network slice template. Specifically, the NSMF searches for, based on the network slice type, the network slice template identifier corresponding to the network slice type, and then obtains the network slice template based on the network slice template identifier.

In this case, the NSMF may further allocate an identifier to the network slice instance corresponding to the network slice template, that is, allocate a network slice instance identifier (NSI ID). One network slice instance can be obtained by instantiating one network slice template once.

Operation S203: The NSMF decomposes the network slice requirement information into network slice subnet requirement information 1, network slice subnet requirement information 2, and transport network requirement information based on the network slice template.

The NSMF decomposes the network slice requirement information based on content included in the network slice template, to obtain network slice subnet requirement information corresponding to the node description information and transport network requirement information corresponding to the connection description information. The network slice subnet requirement information corresponding to the node description information includes network slice subnet requirement information 1 corresponding to node description information of a network slice subnet node 1 and network slice subnet requirement information 2 corresponding to node description information of a network slice subnet node 2.

The network slice subnet requirement information 1 includes a network slice subnet template identifier (NSST ID), an input parameter required for instantiation of a network slice subnet 1, network connection point information of the network slice subnet node 1, and service access point information of the network slice subnet node 1. The transport network requirement information includes network connection information between the network slice subnet node 1 and the network slice subnet node 2. The network slice subnet requirement information 2 includes a network slice subnet template identifier (NSST ID), an input parameter required for instantiation of a network slice subnet 2, network connection point information of the network slice subnet node 2, and service access point information of the network slice subnet node 2.

It may be understood that the network slice subnet requirement information provides the input parameter for the instantiation of the network slice subnet, including providing the input parameter for the instantiation of the network slice subnet, providing the network connection point information for the network connection point of the network slice subnet node, and providing the service access point information for the service access point of the network slice subnet node; and the transport network requirement information provides an input parameter for instantiation of a transport network, including providing a network connection input parameter for the network connection between the network slice subnet nodes.

It may be understood that the network slice template defines components required for network slice instantiation and input parameters required by the components. The network slice requirement information may provide the input parameters. The NSMF may decompose the network slice requirement information based on the network slice template, to be specific, provide corresponding input parameters for the components based on the input parameters required by the components.

After the decomposition, the NSMF determines deployment areas of an NSSI-1 and an NSSI-2 based on the network slice requirement information, that is, determines a deployment location of each NSSI. In this way, the MANO can subsequently deploy, in a data center (DC) in a correct area, a network function corresponding to a network slice subnet instance.

If the network slice instance includes a network function, the NSMF decomposes the network slice requirement information into service configuration requirement information, network service requirement information, and transport network requirement information of a network function in a network slice based on the network slice template. For the three pieces of information, refer to descriptions in the embodiment shown in FIG. 6.

Operation S204a: The NSMF sends a network slice subnet instantiation request 1 to an NSSMF 1, where the network slice subnet instantiation request 1 includes the network slice subnet requirement information 1; and correspondingly the NSSMF 1 receives the network slice subnet instantiation request 1 from the NSMF.

Operation S204b: The NSMF sends a network slice subnet instantiation request 2 to an NSSMF 2, where the network slice subnet instantiation request 2 includes the network slice subnet requirement information 2; and correspondingly the NSSMF 2 receives the network slice subnet instantiation request 2 from the NSMF.

Specifically, the NSMF sends a network slice subnet instantiation request to each NSSMF, where the network slice subnet instantiation request carries corresponding network slice subnet requirement information. For example, a network slice includes the network slice subnet 1 and the network slice subnet 2; the NSMF sends the network slice subnet instantiation request 1 to the NSSMF 1, where the request 1 carries requirement information of the network slice subnet 1; and the NSMF sends the network slice subnet instantiation request 2 to the NSSMF 2, where the request 2 carries requirement information of the network slice subnet 2.

The NSSMF 1 decomposes the requirement information of the network slice subnet 1 based on an NSST 1 to obtain network service requirement information 1, service configuration requirement information 1, and transport network requirement information 1; sends the network service requirement information 1 to the MANO; sends the service configuration requirement information 1 to an EMS 1 corresponding to the NSSMF 1; and sends the transport network requirement information 1 to the TN-manager. The NSSMF 2 decomposes the requirement information of the network slice subnet 2 based on an NSST 2 to obtain network service requirement information 2, service configuration requirement information 2, and transport network requirement information 2; sends the network service requirement information 2 to the MANO; sends the service configuration requirement information 2 to an EMS 2 corresponding to the NSSMF 2; and sends the transport network requirement information 2 to the TN-manager.

The network slice subnet instantiation request further includes a deployment area of a corresponding network slice subnet instance, so that the MANO can subsequently deploy, in a DC in a correct area, a network function corresponding to the network slice subnet instance. For example, the network slice subnet instantiation request 1 further includes the deployment area of the NSSI-1, and the network slice subnet instantiation request further includes the deployment area of the NSSI-2.

The network slice subnet instance request may further include a network slice instance identifier (NSI ID) corresponding to the network slice.

The network slice subnet requirement information may further include a corresponding network slice subnet template identifier or network slice type.

Operation S205a: The NSSMF 1 sends a network slice subnet instantiation response 1 to the NSMF, where the network slice subnet instantiation response 1 includes instantiation information 1; and correspondingly the NSMF receives the network slice subnet instantiation response 1 from the NSSMF 1.

Operation S205b: The NSSMF 2 sends a network slice subnet instantiation response 2 to the NSMF, where the network slice subnet instantiation response 2 includes instantiation information 2; and correspondingly the NSMF receives the network slice subnet instantiation response 2 from the NSSMF 2.

After completing instantiation of a network service 1, the NSSMF 1 sends the instantiation information 1 to the NSMF. After completing instantiation of a network service 2, the NSSMF 2 sends the instantiation information 2 to the NSMF.

The instantiation information 1 includes a network slice subnet instance 1 identifier (NSSI-1 ID), network connection point instantiation information of a network slice subnet instance 1, and service access point instantiation information of the network slice subnet instance 1.

The network connection point instantiation information of the NSSI-1 includes information such as a local IP address of a network connection point for interconnection between the NSSI-1 and the NSSI-2, and further includes information such as an IP address of a network connection point for interconnection between the NSSI-1 and an external access device. Similarly, network connection point instantiation information of the NSSI-2 may be defined.

The service access point instantiation information of the NSSI-1 includes a local IP address of a service access point for interconnection between the NSSI-1 and the NSSI-2, and further includes information such as an IP address of a service access point for interconnection between the NSSI-1 and an external access device. Similarly, service access point instantiation information of the NSSI-2 may be defined.

Access device information may be information about interconnection between a gateway router in a DC in which a network slice subnet instance is deployed and a transmission switch, and includes an access device identifier, a port identifier, and the like.

For the NSSI 1, the local IP address is an IP address of the NSSI-1, and a peer IP address is an IP address of the NSSI-2.

The NSMF may record and store instantiation information sent by each NSSMF.

It should be noted that operation S204a and operation S205a, and operation S204b and operation S205b each are a procedure of network slice subnet instantiation. For details, refer to descriptions in FIG. 5A and FIG. 5B.

Operation S206a: The NSMF sends a service access request 1 to the NSSMF 1, and correspondingly the NSSMF 1 receives the service access request 1 from the NSMF.

Operation S206b: The NSMF sends a service access request 2 to the NSSMF 2, and correspondingly the NSSMF 2 receives the service access request 2 from the NSMF.

Operation S206a and operation S206b are performed after operation S205a and operation S205b.

The service access request includes the network slice instance identifier, the network slice subnet template identifier, and the service access point information. The service access point instantiation information includes information such as a local IP address and a peer IP address of a service access point for interconnection between the network slice subnet instance and another network slice subnet instance, and an IP address of a gateway router. The IP address of the gateway router is an IP address of a next-hop router. For example, a service access point of the NSSI-1 is interconnected to a service access point of the NSSI-2. For the NSSI-1, the local IP address is an IP address of the service access point of the NSSI-1, and the peer IP address is an IP address of the service access point of the NSSI-2.

After receiving the instantiation information 1 and the instantiation information 2, the NSMF sends the service access request 1 to the NSSMF 1. The service access request 1 carries a network slice instance identifier, a network slice subnet template identifier corresponding to the network slice subnet instance 1, and service access point information 1.

After receiving the instantiation information 1 and the instantiation information 2, the NSMF sends the service access request 2 to the NSSMF 2. The service access request 2 carries a network slice instance identifier, a network slice subnet template identifier corresponding to the network slice subnet instance 2, and service access point information 2.

Operation S207a: The NSSMF 1 sends a service access acknowledgement message 1 to the NSMF, and correspondingly the NSMF receives the service access acknowledgement message 1 from the NSSMF 1.

Operation S207b: The NSSMF 2 sends a service access acknowledgement message 2 to the NSMF, and correspondingly the NSMF receives the service access acknowledgement message 2 from the NSSMF 2.

After the EMS completes service configuration, the NSSMF sends a service access acknowledgement message to the NSMF, where the service access acknowledgement message carries the network slice subnet instance identifier, to notify the NSMF that a corresponding network slice subnet instance has accessed a service. For example, the service access acknowledgement message 1 is used to notify that the NSSI-1 has accessed the service, and the service access acknowledgement message 2 is used to notify that the NSSI-2 has accessed the service.

It should be noted that, operation S206a and operation S207a, and operation S206b and operation S207b each are a procedure of service access instantiation. For details, refer to descriptions in FIG. 7.

Operation S208: The NSMF sends a transport network instantiation request to the TN-manager, and correspondingly, the TN-manager receives the transport network instantiation request from the NSMF.

It should be noted that operation S208 is performed after operation S205a and operation S205b, and operation S208 may be performed simultaneously with operation S206a and operation S206b.

The NSMF creates a transport network instantiation request between network slice subnet instances based on the instantiation information sent by each NSSMF, for example, creates a transport network instantiation request between the NSSI-1 and the NSSI-2.

Two network slice subnet instances are used as an example. The transport network instantiation request includes information such as IP addresses (that is, IP addresses of two ends) for a network connection between the NSSI-1 and the NSSI-2 (that is, information such as network connection IP addresses for interconnection between the network slice subnet node 1 and the network slice subnet node 2), and QoS information for a network connection between the NSSI-1 network slice subnet instance 1 and the NSSI-2 network slice subnet instance 2 (that is, QoS information for a network connection between the network slice subnet node 1 and the network slice subnet node 2). The transport network instantiation request further includes information about an access device for interconnection between the NSSI-1 network slice subnet instance 1 and the NSSI-2 network slice subnet instance 2. The information about the access device may be information about interconnection between a gateway router in a DC in which a network slice subnet instance is deployed and a transmission switch, and includes an access device identifier, a port identifier, and the like.

The NSMF can search for information about an access device corresponding to a deployment location based on an imported network-wide data center and an imported transport network topology.

Operation S209: The TN-manager performs transport network instantiation based on the transport network instantiation request.

When receiving the transport network instantiation request, the TN-manager performs the transport network instantiation based on the transport network requirement information, establishes a network connection between network slice subnet instances, and may further establish a network connection between a network slice subnet instance and an access device.

Operation S210: The TN-manager sends an acknowledgement message to the NSMF.

After completing the transport network instantiation, the TN-manager feeds back the acknowledgement message to the NSMF, to notify the NSMF that the transport network instantiation is completed.

In this embodiment shown in FIG. 2A and FIG. 2B, the NSMF decomposes the network slice requirement information into the network slice subnet requirement information and the transport network requirement information by using the network slice template, so that the NSSMF performs network service instantiation and service connection instantiation, and the TN-manager performs the transport network instantiation.

Figure 5A:
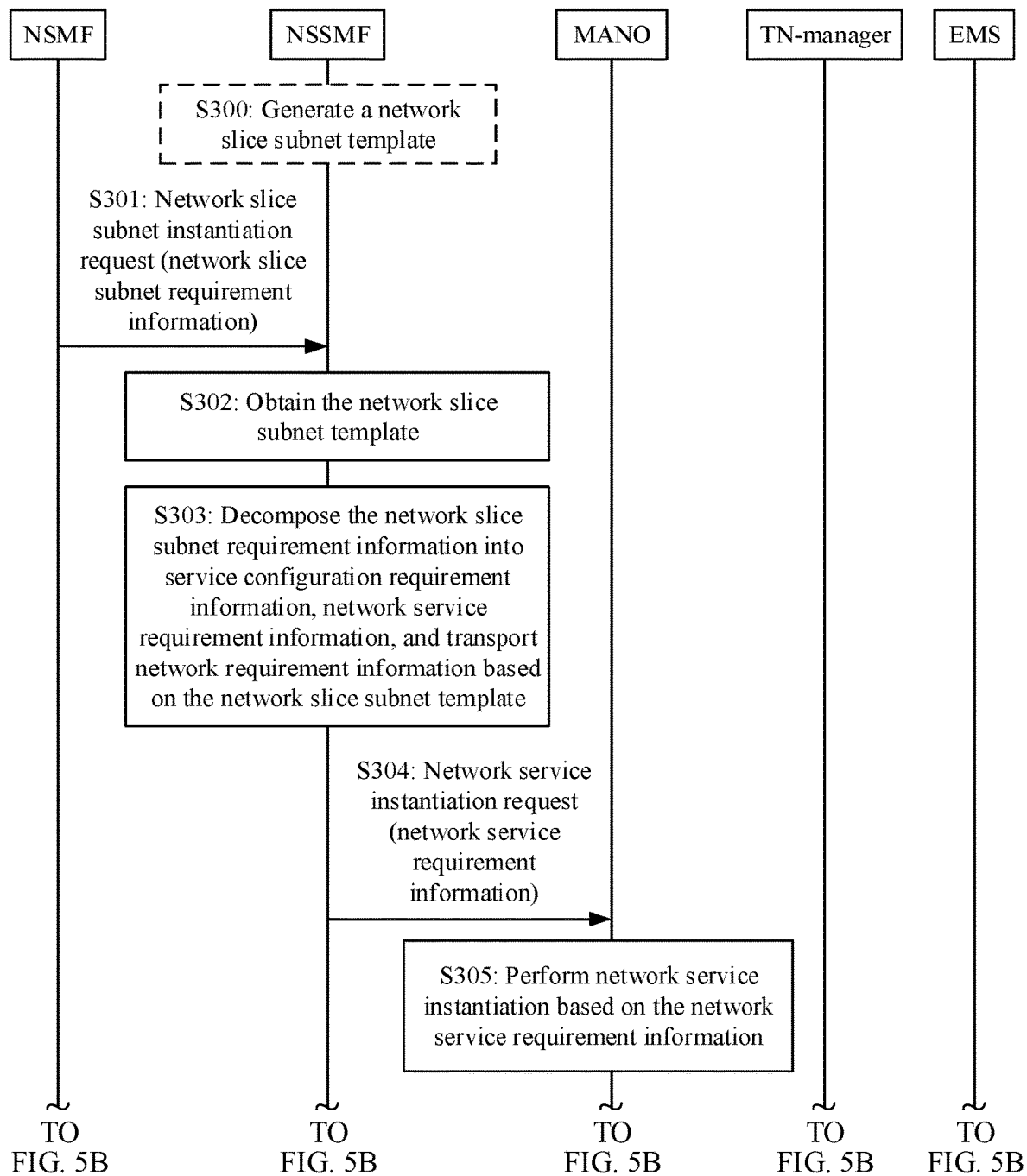
FIG. 5A and FIG. 5B are a schematic flowchart of network slice subnet instantiation according to an embodiment of this application.
Figure 5B:
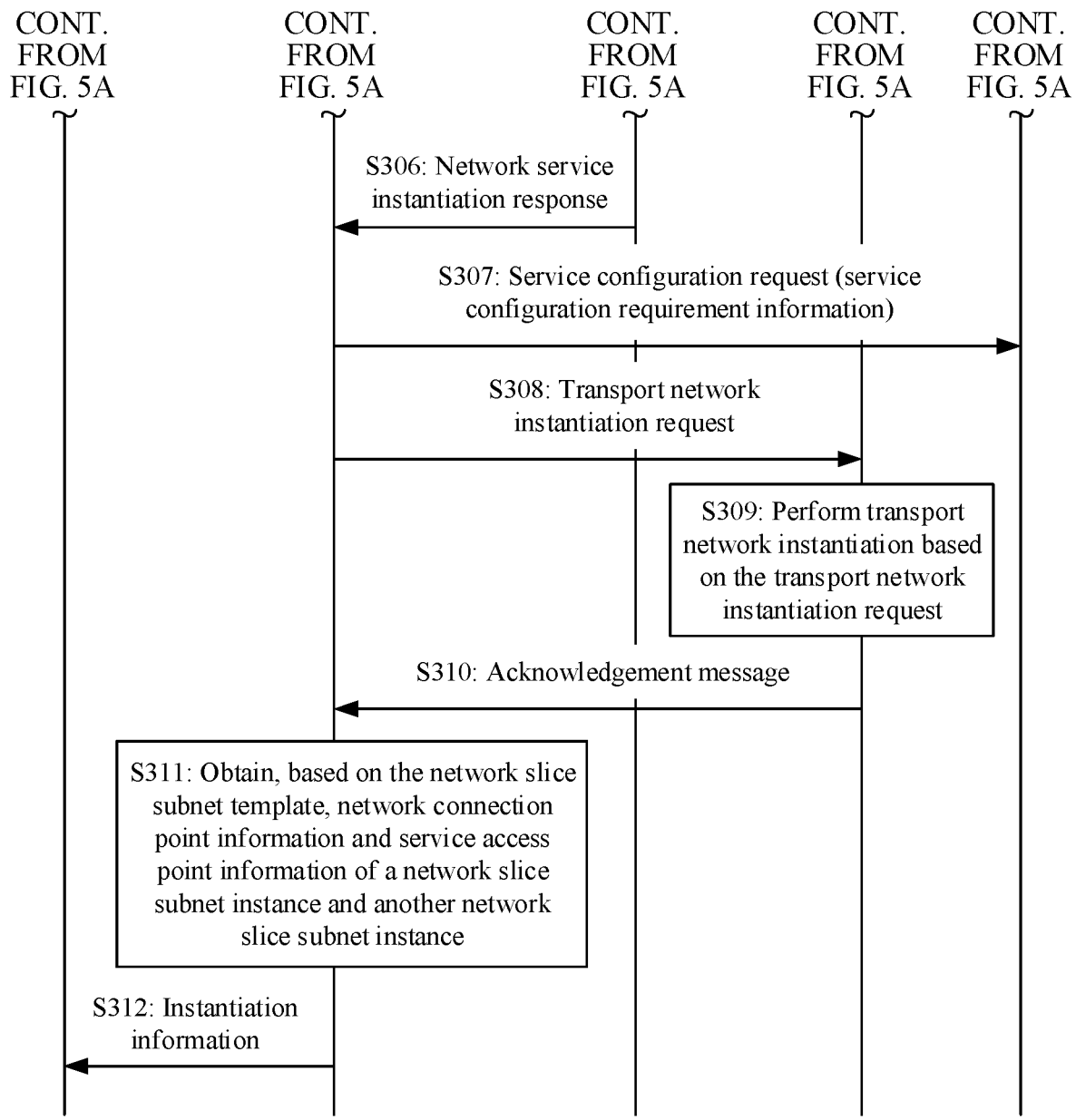

FIG. 5A and FIG. 5B are a schematic flowchart of network slice subnet instantiation according to an embodiment of this application. The procedure is described from a perspective of interaction between an NSMF, an NSSMF, and a MANO. One NSSMF is used as an example for description. The procedure shown in FIG. 5A and FIG. 5B may include but is not limited to the following operations.

Operation S300: Generate a network slice subnet template.

A slice-related person (for example, a slice provider) designs the network slice subnet template, generates the network slice subnet template, and on-boards the network slice subnet template to the NSSMF. The NSSMF may record and store a correspondence between a network slice subnet template and network slice subnet requirement information, where the network slice subnet requirement information includes a network slice subnet template identifier or a network slice type. The network slice type is used to represent a type of a network service provided by a slice, for example, a high-definition video service type or an internet of vehicles type.

Figure 6:
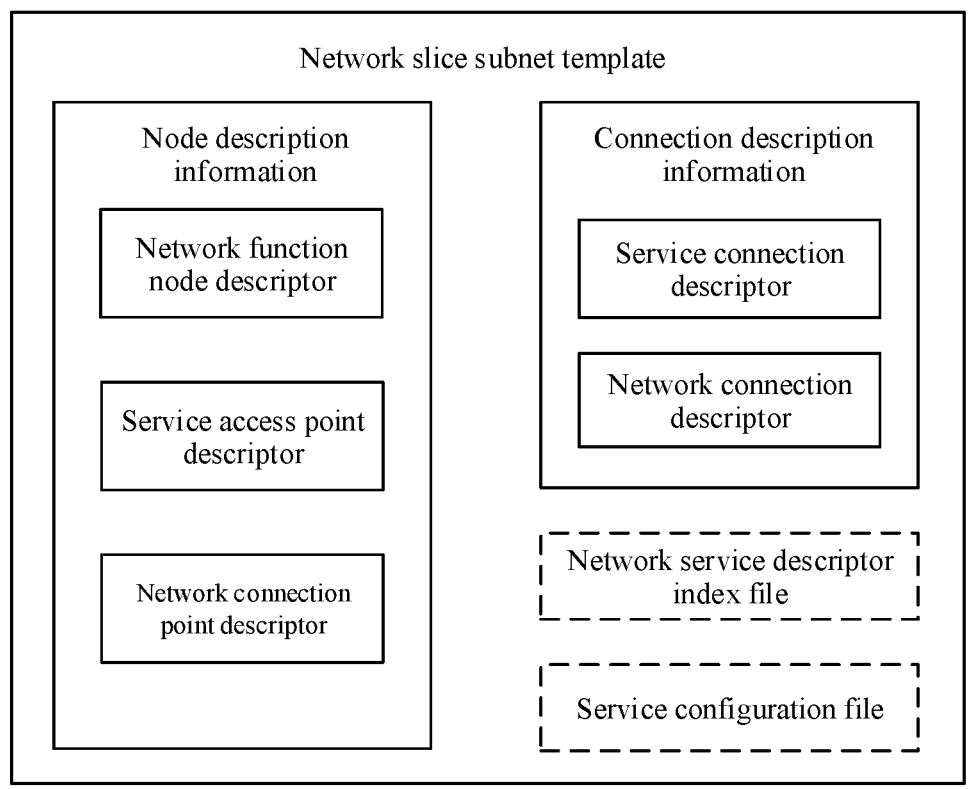
FIG. 6 is a schematic composition diagram of a network slice subnet template according to an embodiment of this application.

For a schematic composition diagram of the network slice subnet template, refer to FIG. 6. The network slice subnet template is used to describe component information required for network slice subnet instantiation, includes node description information of a network function node included in a network slice subnet and connection description information between network function nodes, and specifically includes node description information of each network function node and connection description information between the nodes.

The node description information of the network function node includes a network function node descriptor, a network connection point descriptor of the network function node, and a service access point descriptor of the network function node. The connection description information includes a service connection descriptor between the network function nodes and a network connection descriptor between the network function nodes.

The network function node descriptor is used to describe an input parameter required for network function subnet instantiation.

For the network connection point descriptor of the network function node, the service access point descriptor of the network function node, the service connection descriptor between the network function nodes, the network connection descriptor between the network function nodes, the network connection point descriptor of the network slice subnet node, the service access point descriptor of the network slice subnet node, the service connection descriptor between the network slice subnet nodes, and a type of a network connection descriptor between network slice subnet nodes, refer to the foregoing descriptions. Details are not described herein again.

The network slice subnet template may include a service configuration file shown in a dashed block in FIG. 6, and the service configuration file is used for service configuration of a network function. It may be understood that the service configuration file indicates service functions that need to be implemented by the network function.

The network slice subnet template may include a network service descriptor index file shown in a dashed-line block in FIG. 6, and may be an NSD ID. The network service descriptor is used for instantiating virtual resource deployment of a network function, and the network function is a network function included in a network slice subnet. It may be understood that the MANO may complete the virtual resource deployment of the network function based on an NSD file corresponding to a network service descriptor ID index in this case. The virtual resource may include a virtual memory resource, a virtual CPU, and the like.

If a network slice subnet instance may nest another network slice subnet instance, in addition to the content shown in FIG. 6, the network slice subnet template may further include a network slice subnet template corresponding to the nested network slice subnet instance.

Operation S301: The NSSMF receives a network slice subnet instantiation request, where the network slice subnet instantiation request includes network slice subnet requirement information.

It may be understood that the network slice subnet requirement information is an input parameter provided by the NSMF for the NSSMF, so that the NSSMF instantiates a network slice subnet.

The network slice subnet instantiation request further includes a deployment area of the network slice subnet instance, so that in an instantiation process, the MANO can deploy a network function corresponding to the network slice subnet instance in a DC in a correct area.

The network slice subnet instantiation request further includes a network slice instance identifier, so that the NSSMF manages a network slice instance to which the network slice subnet requirement information belongs.

It should be noted that operation S301 corresponds to operation S204a and operation S204b in the embodiment shown in FIG. 2A and FIG. 2B.

Operation S302: The NSSMF obtains the network slice subnet template.

In one embodiment, the NSSMF obtains, based on the network slice subnet template identifier, the network slice subnet template corresponding to the network slice subnet template identifier. One network slice subnet template identifier corresponds to one network slice subnet template.

In one embodiment, the NSSMF obtains, based on the network slice type, a network slice template corresponding to the network slice type. One network slice type corresponds to one network slice subnet template. Specifically, the NSSMF searches for, based on the network slice type, the network slice subnet template identifier corresponding to the network slice type, and then obtains the network slice subnet template based on the network slice subnet template identifier.

In this case, the NSSMF may further allocate an identifier to the network slice subnet instance corresponding to the network slice subnet template, that is, allocate a network slice subnet instance identifier (NSSI ID). One network slice subnet instance can be obtained by using one network slice subnet template through instantiation once.

Operation S303: The NSSMF decomposes the network slice subnet requirement information into network service requirement information, service configuration requirement information, and transport network requirement information in a network slice subnet based on the network slice subnet template.

The NSSMF obtains, from the network slice subnet requirement information based on the network slice subnet template, an input parameter required for network function subnet instantiation, network connection point information of the network function node, service access point information of the network function node, network connection information between the network function nodes, and service connection information between the network function nodes.

If the component information required for network slice subnet instantiation further includes index information of a network service descriptor corresponding to a virtualized network function included in the network slice subnet instance, that is, the NSST includes an NSD index file corresponding to VNFs included in the NSSI, the NSSMF generates an instantiation input parameter of the NSD based on the obtained five types of information, that is, generates an input parameter required for NS instantiation. In this case, the network service requirement information is the instantiation input parameter of the NSD.

If the component information required for network slice subnet instantiation includes no index information of a network service descriptor corresponding to a virtualized network function included in the network slice subnet instance, that is, the NSST includes no an NSD index file corresponding to VNFs included in the NSSI, the NSSMF generates, based on the obtained five types of information, an NSD file corresponding to the VNFs included in the NSSI. In this case, the network service requirement information is the generated NSD file.

If the component information required for network slice subnet instantiation further includes index information of a first service configuration file, that is, the NSST includes the index information of the first service configuration file, the NSSMF generates an input parameter of the first service configuration file based on the foregoing obtained five types of information. In this case, the service configuration requirement information is the input parameter of the first service configuration file.

If the component information required for network slice subnet instantiation includes no index information of a first service configuration file, that is, the NSST includes no index information of the first service configuration file, the NSSMF generates the first service configuration file based on the foregoing obtained five types of information, and the service configuration requirement information is the first service configuration file.

The first service configuration file is a non-service access point configuration file of the network slice subnet instance, that is, includes no service access point configuration file for interconnection between the network slice subnet instance and another network slice subnet instance.

The transport network requirement information provides an input parameter for transport network instantiation, including providing a network connection input parameter for a network connection between network function nodes.

Operation S304: The NSSMF sends a network service instantiation request to the MANO, where the network service instantiation request includes the network service requirement information.

The network service instantiation request further includes the network slice subnet template identifier.

When the network slice subnet instantiation request includes the deployment area of the network slice subnet instance, the network service instantiation request further includes the deployment area of the network slice subnet instance.

The network service instantiation request further includes a network service descriptor identifier (NSD ID), so that the MANO instantiates an NS corresponding to the NSD ID.

Operation S305: The MANO performs network service instantiation based on the network service requirement information.

The MANO instantiates the network service based on the network service requirement information, including deploying a detailed location of a network function.

If the network service requirement information is instantiation requirement information of the NSD, the MANO instantiates the network service based on the instantiation requirement information of the NSD. If the network service requirement information is an NSD file, the MANO instantiates the network service based on the NSD file.

Operation S306: The MANO sends a network service instantiation response to the NSSMF.

When completing the network service instantiation, the MANO sends the network service instantiation response to the NSSMF, where the network service instantiation response includes the network slice subnet instance identifier (NSSI ID), deployment location information of a network function included in the network slice subnet instance, and network connection point instantiation information of a network connection point corresponding to a VNF. The network connection point instantiation information includes information such as an IP address.

Operation S307: The NSSMF sends a service configuration request to the EMS corresponding to the NSSMF, where the service configuration request includes the service configuration requirement information.

The service configuration requirement information is the first service configuration file or requirement information of the first service configuration file.

Operation S308: The NSSMF sends a transport network instantiation request to a TN-manager, where the transport network instantiation request includes the transport network requirement information.

Operation S308 is similar to operation S208 in the embodiment shown in FIG. 2B, and a difference lies in that operation S208 is for a transport network including a network slice subnet node, and operation S308 is for a transport network including a network function.

Operation S309: The TN-manager performs transport network instantiation based on the transport network instantiation request.

When receiving the transport network instantiation request, the TN-manager performs the transport network instantiation based on the transport network instantiation request, to establish a network connection between network functions.

Operation S310: The TN-manager sends an acknowledgement message to the NSSMF.

After completing the transport network instantiation, the TN-manager feeds back the acknowledgement message to the NSSMF, to notify the NSSMF that the transport network instantiation is completed.

Operation S311: The NSSMF obtains, based on the network slice subnet template, network connection point information of the network slice subnet instance and another network slice subnet instance, and service access point information corresponding to the network connection point information of the network slice subnet instance and the another network slice subnet instance.

A network connection point descriptor of the network slice subnet node describes network connection point information used for a network connection between a network slice subnet node and another network slice subnet node. Therefore, the NSSMF may obtain the network connection point information of the network slice subnet instance and the another network slice subnet instance based on the network connection point descriptor of the network slice subnet node with reference to the network slice subnet requirement information.

A service access point descriptor of the network slice subnet node describes service access point information used for a service connection between the network slice subnet node and the another network slice subnet node. Therefore, the NSSMF may obtain the service access point information of the network slice subnet instance and the another network slice subnet instance based on the service access point descriptor of the network slice subnet node with reference to the network slice subnet requirement information.

Operation S312: The NSSMF sends instantiation information to the NSMF.

The instantiation information includes the network slice subnet instance identifier, network connection point instantiation information of the network slice subnet instance, and service access point instantiation information of the network slice subnet instance.

The network connection point instantiation information of the network slice subnet instance includes a local IP address of a network connection point for interconnection between the network slice subnet instance and the another network slice subnet instance, and further includes information about a network connection point for interconnection between the network slice subnet instance and an application server or an external access device.

The service access point instantiation information of the network slice subnet instance includes a local IP address of a service access point for interconnection between the network slice subnet instance and the another network slice subnet instance, and further includes service access point information of interconnection between the network slice subnet instance and an application server or an external access device.

Assuming that an NSSI-1 is interconnected to an NSSI 2, for the NSSI-1, the local IP address is an IP address of the NSSI-1, and a peer IP address is an IP address of the NSSI-2.

The NSMF may record and store the instantiation information sent by each NSSMF.

It should be noted that operation S312 corresponds to operation S205a and operation S205b in the embodiment shown in FIG. 2A and FIG. 2B.

It should be noted that an execution sequence of operation S304, operation S307, and operation S308 is not limited to that shown in FIG. 5A and FIG. 5B, and the three operations may be performed simultaneously.

The NSSMF in the procedure shown in FIG. 5A and FIG. 5B may be any NSSMF. If the network slice instance includes a plurality of network slice subnet instances, there are a plurality of NSSMFs, and a procedure of network slice subnet instantiation for each NSSMF may be performed based on the foregoing procedure.

Figure 7:
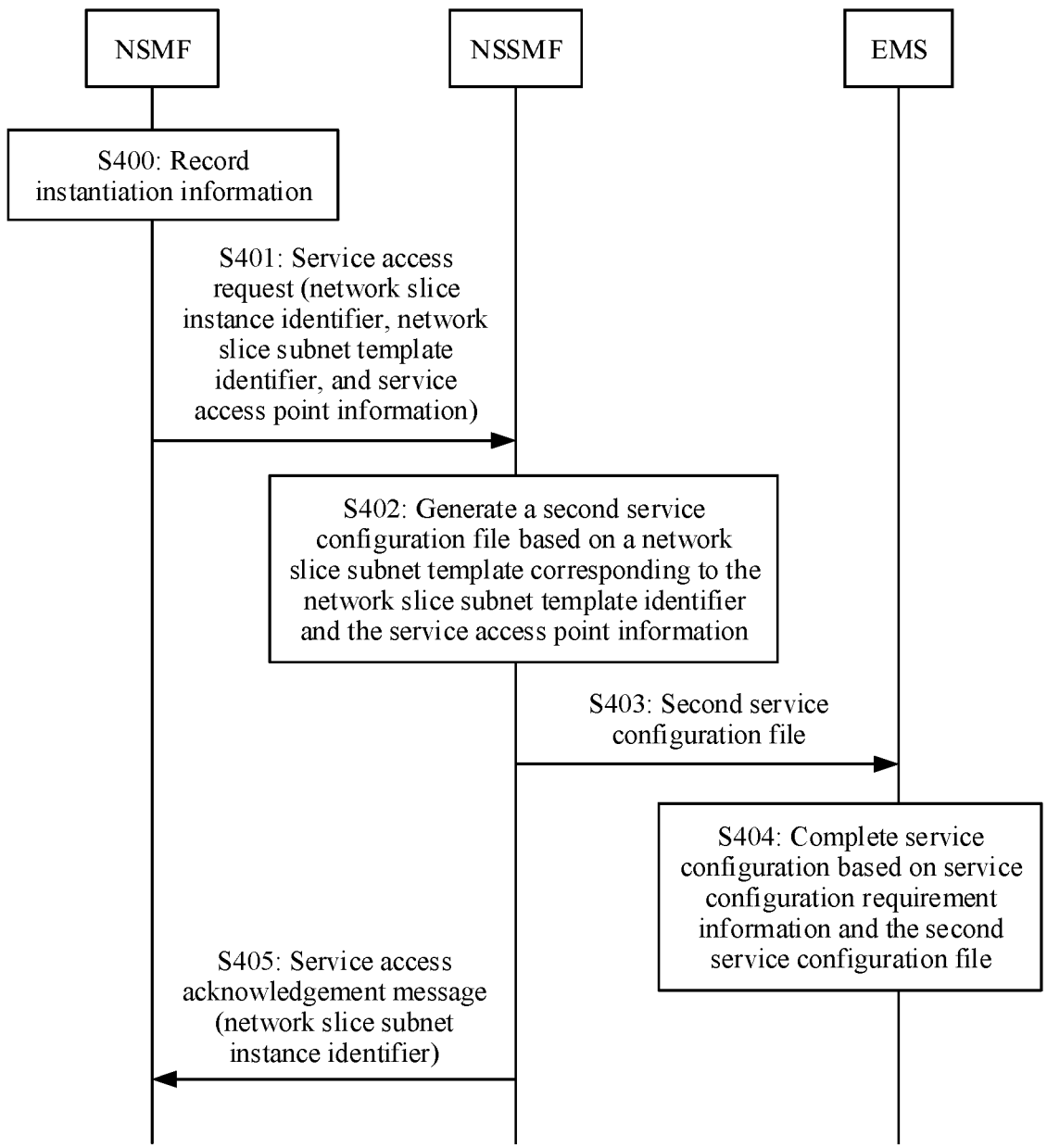
FIG. 7 is a schematic flowchart of service connection instantiation according to an embodiment of this application.

FIG. 7 is a schematic flowchart of service connection instantiation according to an embodiment of this application. The procedure is described from a perspective of interaction between an NSMF, an NSSMF, and an EMS. The procedure shown in FIG. 7 may include but is not limited to the following operations.

Operation S400: The NSMF records instantiation information sent by the NSSMF.

Operation S401: The NSMF sends a service access request to the NSSMF, where the service access request includes a network slice instance identifier, a network slice subnet template identifier, and service access point information.

Service access point instantiation information includes local address information and peer address information of a service access point for interconnection between a network slice subnet instance and another network slice subnet instance, and address information of a gateway router. An IP address of the gateway router is an IP address of a next-hop router. For example, a service access point of an NSSI 1 and a service access point of an NSSI 2 are interconnected to each other. For the NSSI 1, a local IP address is an IP address of the service access point of the NSSI 1, and a peer IP address is an IP address of the service access point of the NSSI 2.

After receiving instantiation information of the network slice subnet instance 1 and the network slice subnet instance 2, the NSMF sends a service access request to the NSSMF 1, where the service access request carries a network slice instance identifier, a network slice subnet template identifier corresponding to the network slice subnet instance 1, and service access point information 1.

After receiving the instantiation information of the network slice subnet instance 1 and the network slice subnet instance 2, the NSMF sends a service access request to the NSSMF 2, where the service access request carries a network slice instance identifier, a network slice subnet template identifier corresponding to the network slice subnet instance 2, and service access point information 2.

It should be noted that operation S401 corresponds to operation S206a and operation S206b in the embodiment shown in FIG. 2B.

Operation S402: The NSSMF generates a second service configuration file based on a network slice subnet template and the service access point information, where the second service configuration file is a service configuration file used for interconnection between the network slice subnet instance and the another network slice subnet instance.

Operation S403: The NSSMF sends the second service configuration file to the EMS corresponding to the NSSMF.

Operation S404: The EMS completes service configuration based on a first service configuration file and the second service configuration file.

An EMS 1 corresponding to an NSSMF 1 completes service configuration based on the first service configuration file and the second service configuration file, that is, completes service configuration deployment of the network slice subnet instance, so that the NSSI 1 can access a service to implement a service function.

For descriptions of the first service configuration file, refer to descriptions of operation S303 in the embodiment shown in FIG. 5A.

Operation S405: The NSSMF sends a service access acknowledgement message to the NSMF, where the service access acknowledgement message includes the network slice subnet instance identifier.

After the EMS completes service configuration, the NSSMF sends the service access acknowledgement message to the NSMF, where the service access acknowledgement message carries the network slice subnet instance identifier, to notify the NSMF that a corresponding network slice subnet instance has accessed a service, for example, the NSSI 1 has accessed the service.

It should be noted that operation S405 corresponds to operation S207a and operation S207b in the embodiment shown in FIG. 2B.

The NSSMF in the procedure shown in FIG. 7 may be any NSSMF. If the network slice instance includes a plurality of network slice subnet instances, there are a plurality of NSSMFs, and a procedure of service access instantiation for each NSSMF may be performed based on the foregoing procedure.

The foregoing describes the methods in the embodiments of this application in detail, and the following provides apparatuses in the embodiments of this application.

Figure 8:
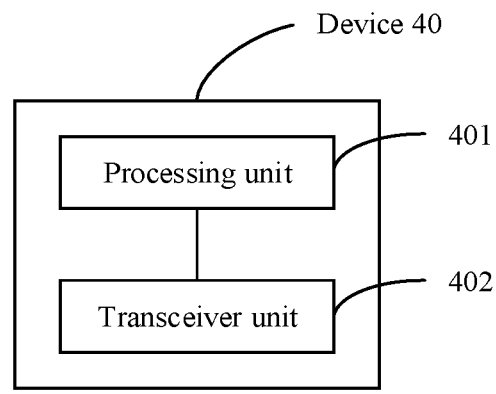
FIG. 8 is a schematic diagram of a logical structure of a device according to an embodiment of this application.

FIG. 8 is a schematic diagram of a logical structure of a device according to an embodiment of this application. The device 40 may include a processing unit 401 and a transceiver unit 402. The device 40 may be the NSMF, the NSSMF, or the TN-manager in the embodiments shown in FIG. 2A and FIG. 2B, FIG. 5A and FIG. 5B, and FIG. 7.

If the device 40 is the NSMF in the embodiments shown in FIG. 2A and FIG. 2B, FIG. 5A and FIG. 5B, and FIG. 7, the transceiver unit 402 may be configured to communicate with a CSMF, an NSSMF, and a TN-manager, for example, perform operation S201, operation S204 (a or b), operation S205 (a or b), operation S206 (a or b), operation S207 (a or b), operation S209, and operation S210 in the embodiment shown in FIG. 2A and FIG. 2B, perform operation S312 in the embodiment shown in FIG. 5B, and perform operation S405 in the embodiment shown in FIG. 7. The processing unit 401 may be configured to perform an operation of controlling the NSMF, for example, perform operation S202 and operation S203 in the embodiment shown in FIG. 2A. For details, refer to corresponding descriptions in the embodiments shown in FIG. 2A and FIG. 2B, FIG. 5A and FIG. 5B, and FIG. 7. Details are not described herein again.

If the device 40 is the NSSMF in the embodiments shown in FIG. 2A and FIG. 2B, FIG. 5A and FIG. 5B, and FIG. 7, the transceiver unit 402 may be configured to communicate with an NSMF, a TN-manager, an MANO, and an EMS, for example, perform operation S204 (a or b), operation S205 (a or b), operation S206 (a or b), and operation S207 (a orb) in the embodiment shown in FIG. 2A and FIG. 2B, perform operation S301, operation S304, operation S306, operation S307, operation S308, and operation S310 in the embodiment shown in FIG. 5A and FIG. 5B, and perform operation S401, operation S403, and operation S405 in the embodiment shown in FIG. 7. The processing unit 401 may be configured to perform an operation of controlling the NSSMF, for example, perform operation S302, operation S303, and operation S311 in the embodiment shown in FIG. 5A and FIG. 5B, and perform operation S402 in the embodiment shown in FIG. 7. For details, refer to corresponding descriptions in the embodiments shown in FIG. 2A and FIG. 2B, FIG. 5A and FIG. 5B, and FIG. 7. Details are not described herein again.

If the device 40 is the TN-manager in the embodiments shown in FIG. 2A and FIG. 2B, FIG. 5A and FIG. 5B, and FIG. 7, the transceiver unit 402 may be configured to communicate with an NSMF and an NSSMF, for example, perform operation S208 in the embodiment shown in FIG. 2B, and perform operation S308 in the embodiment shown in FIG. 5B. The processing unit 401 may be configured to perform an operation of controlling the TN-manager, for example, perform operation S209 in the embodiment shown in FIG. 2B and perform operation S309 in the embodiment shown in FIG. 5B. For details, refer to corresponding descriptions in the embodiments shown in FIG. 2A and FIG. 2B, FIG. 5A and FIG. 5B, and FIG. 7. Details are not described herein again.

Figure 9:
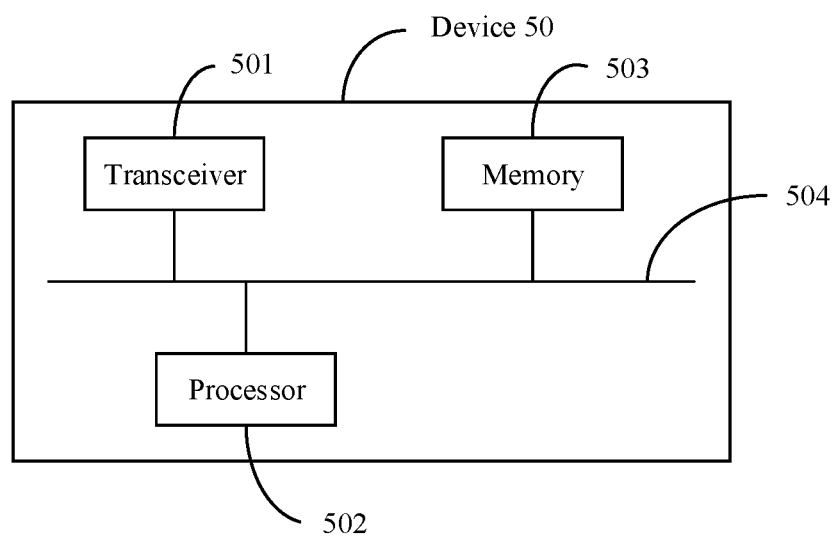
FIG. 9 is a simplified schematic diagram of an entity structure of a device according to an embodiment of this application.

FIG. 9 is a simplified schematic diagram of an entity structure of a device according to an embodiment of this application. The device 50 may be the NSMF, the NSSMF, or the TN-manager in the embodiments shown in FIG. 2A and FIG. 2B, FIG. 5A and FIG. 5B, and FIG. 7. The device 50 includes a transceiver 501, a processor 502, and a memory 503. The transceiver 501, the processor 502, and the memory 503 may be connected to each other by using a bus 504, or may be connected to each other in another manner. A related function implemented by the processing unit 401 shown in FIG. 8 may be implemented by one or more processors 502. A related function implemented by the transceiver unit 402 shown in FIG. 8 may be implemented by the transceiver 501.

The memory 503 includes but is not limited to a random access memory (RAM), a read-only memory (ROM), an erasable programmable read-only memory (erasable programmable read only memory, EPROM), or a portable read-only memory (CD-ROM). The memory 503 is configured to store a related instruction and related data.

The transceiver 501 is configured to send data and/or signaling, and receive data and/or signaling.

The processor 502 may include one or more processors, for example, include one or more central processing units (CPU). When the processor 502 is one CPU, the CPU may be a single-core CPU, or may be a multi-core CPU.

If the device 50 is the NSMF, the processor 502 is configured to support the NSMF in performing operation S202 and operation S203 in the embodiment shown in FIG. 2A.

If the device 50 is the NSSMF, the processor 502 is configured to support the NSSMF in performing operation S302, operation S303, and operation S311 in the embodiment shown in FIG. 5A and FIG. 5B, and performing operation S402 in the embodiment shown in FIG. 7.

If the device 50 is the TN-manager, the processor 502 is configured to support the TN-manager in performing operation S206a fa S206b in the embodiment shown in FIG. 2B and operation S309 in the embodiment shown in FIG. 5B.

The memory 503 is configured to store program code and data of the device 50.

The transceiver 501 is configured to communicate with another device. If the device 50 is a CSMF, the transceiver 501 is configured to communicate with an NSMF entity, an operator, or a third-party customer. If the device is an NSMF, the transceiver 501 is configured to communicate with a CSMF, an NSSMF, and a TN-manager. If the device is an NSSMF entity, the transceiver is configured to communicate with an NSMF, a TN-manager, an MANO, and an EMS.

For details of the operations performed by the processor 502 and the transceiver 501, refer to descriptions in the embodiments shown in FIG. 2A and FIG. 2B, FIG. 5A and FIG. 5B, and FIG. 7. Details are not described herein again.

It may be understood that FIG. 9 shows merely a simplified design of the device. In actual applications, the device may further include other necessary components, including but not limited to any quantities of transceivers, processors, controllers, memories, and communications units. All devices capable of implementing this application fall within the protection scope of this application.

An embodiment of this application further provides a network slice management system, including the NSMF, the NSSMF, and the CSMF shown in FIG. 1, and further including the TN-manager, the MANO, the EMS in the embodiments shown in FIG. 2A and FIG. 2B, FIG. 5A and FIG. 5B, and FIG. 7, and the like.

A person of ordinary skill in the art may understand that all or some of the processes of the methods in the embodiments may be completed by a computer program instructing relevant hardware. The program may be stored in a computer-readable storage medium. When the program is executed, the processes of the foregoing methods embodiments are performed. The foregoing storage medium includes any medium that can store program code, such as a ROM, a random access memory RAM, a magnetic disk, or an optical disk. Therefore, another embodiment of this application provides a computer-readable storage medium. The computer-readable storage medium stores an instruction, and when the instruction is run on a computer, the computer is enabled to perform the methods in the foregoing aspects.

Still another embodiment of this application further provides a computer program product including an instruction, and when the computer program product is run on a computer, the computer is enabled to perform the methods in the foregoing aspects.

A person of ordinary skill in the art may be aware that, with reference to the examples described in the embodiments disclosed in this application, units and algorithm operations may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by the person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that, the disclosed system, apparatus, and method may be implemented in another manner. For example, the described apparatus embodiments are merely examples. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one location, or may be distributed on a plurality of network units. Some or all of the units may be selected depending on actual requirements to achieve the objectives of the solutions in the embodiments.

In addition, functional units in the embodiments of this application may be integrated into one processing unit, or each of the units may exist alone physically, or two or more units are integrated into one unit.

All or some of the foregoing embodiments may be implemented by using software, hardware, firmware, or any combination thereof in the foregoing embodiments. When software is used to implement the embodiments, all or some of the embodiments may be implemented in a form of a computer program product. The computer program product includes one or more computer instructions. When the computer program instructions are loaded and executed on a computer, the procedure or functions according to the embodiments of the present invention are all or partially generated. The computer may be a general-purpose computer, a dedicated computer, a computer network, or another programmable apparatus. The computer instruction may be stored in a computer-readable storage medium, or transmitted by using the computer-readable storage medium. The computer instructions may be transmitted from a website, computer, server, or data center to another website, computer, server, or data center in a wired (for example, a coaxial cable, an optical fiber, or a digital subscriber line (DSL)) manner or a wireless (for example, infrared, radio, or microwave) manner. The computer-readable storage medium may be any usable medium accessible by a computer, or a data storage device, such as a server and a data center that are integrated by one or more usable media. The usable medium may be a magnetic medium (for example, a floppy disk, a hard disk, or a magnetic tape), an optical medium (for example, a DVD), a semiconductor medium (for example, a solid-state disk (SSD)), or the like.

The invention claimed is:

1. A network slice management method, comprising:
   receiving, by a network slice management function entity, a network slice instantiation request, wherein the network slice instantiation request comprises network slice requirement information, and the network slice requirement information comprises a network slice template identifier or a network slice type, and network slice deployment requirement information;
   obtaining, by the network slice management function entity, a network slice template based on the network slice template identifier or the network slice type;
   decomposing, by the network slice management function entity based on the network slice template, the network slice requirement information into network slice subnet requirement information of a network slice subnet comprised in the network slice template and transport network requirement information in the network slice;
   for each network slice subnet comprised in the network slice, sending, by the network slice management function entity, a network slice subnet instantiation request to a network slice subnet management function entity, wherein the network slice subnet instantiation request comprises the network slice subnet requirement information;
   receiving, by the network slice management function entity, a network slice subnet instantiation response sent by the network slice subnet management function entity, wherein the network slice subnet instantiation response comprises network slice subnet instantiation information, and the network slice subnet instantiation information comprises a network slice subnet instance identifier, service access point instantiation information of a network slice subnet instance, and network connection point instantiation information of the network slice subnet instance;
   sending, by the network slice management function entity, a transport network instantiation request to a transport network manager, wherein the transport network instantiation request comprises the transport network requirement information in the network slice and network connection point information of all network slice subnet instances; and
   triggering, by the network slice management function entity, an establishment of a service connection of each network slice subnet instance based on service access point information obtained after an instantiation of each network slice subnet.

2. The method according to claim 1, wherein the network slice template comprises a network slice subnet template identifier, a network connection point descriptor of a network slice subnet node, a service access point descriptor of the network slice subnet node, a network connection descriptor between network slice subnet nodes, and a service connection descriptor between the network slice subnet nodes;
   wherein the network connection point descriptor of the network slice subnet node is used to describe network connection point information of the network slice subnet node; the service access point descriptor of the network slice subnet node is used to describe service access point information of the network slice subnet node; the network connection descriptor between the network slice subnet nodes is used to describe network connection information between the network slice subnet nodes; and the service connection descriptor between the network slice subnet nodes is used to describe service connection information between the network slice subnet nodes.

3. The method according to claim 2, wherein a network slice subnet template corresponding to the network slice subnet template identifier comprises a node descriptor of a network function node comprised in the network slice subnet, a network connection point descriptor of the network function node, a service access point descriptor of the network function node, a network connection descriptor between the network function nodes, and a service connection descriptor between the network function nodes.

4. The method according to claim 1, wherein the network slice subnet instantiation request further comprises a deployment area of the network slice subnet instance, and the network slice subnet instance is an instance corresponding to the network slice subnet; and
   before the sending, by the network slice management function entity, a network slice subnet instantiation request to a network slice subnet management function entity, the method further comprises:
   determining, by the network slice management function entity, the deployment area of the network slice subnet instance based on the network slice requirement information.

5. The method according to claim 4, wherein the network slice subnet requirement information further comprises the network slice subnet template identifier or the network slice type.

6. The method according to claim 1, wherein the triggering, by the network slice management function entity, the establishment of the service connection of each network slice subnet instance based on the service access point information obtained after the instantiation of each network slice subnet comprises:
   sending, by the network slice management function entity, a service access request to a corresponding network slice subnet management function entity based on the service access point information obtained after the instantiation of each network slice subnet, wherein the service access request comprises a network slice instance identifier, a corresponding network slice subnet template identifier, and corresponding service access point information, and the service access request is used to trigger a corresponding network slice subnet association function entity to establish the service connection.

7. A network slice management method, comprising:
   receiving, by a network slice subnet management function entity, a network slice subnet instantiation request, wherein the network slice subnet instantiation request comprises network slice subnet requirement information;
   obtaining, by the network slice subnet management function entity, a network slice subnet template;
   decomposing, by the network slice subnet management function entity based on the network slice subnet template, the network slice subnet requirement information into network service requirement information of a network function comprised in the network slice subnet template, service configuration requirement information, and transport network requirement information in a network slice subnet;

sending, by the network slice subnet management function entity, a network slice subnet instantiation response to a network slice management function entity, wherein the network slice subnet instantiation response comprises network slice subnet instantiation information, and the network slice subnet instantiation information comprises a network slice subnet instance identifier, service access point instantiation information of a network slice subnet instance, and network connection point instantiation information of the network slice subnet instance;

sending, by the network slice subnet management function entity, a network service instantiation request to a management and orchestration, wherein the network service instantiation request comprises the network service requirement information;

sending, by the network slice subnet management function entity, a service configuration request to an element management system corresponding to the network slice subnet management function entity, wherein the service configuration request comprises the service configuration requirement information; and sending, by the network slice subnet management function entity, a transport network instantiation request to a transport network manager, wherein the transport network instantiation request comprises the transport network requirement information in the network slice subnet.

8. The method according to claim 7, wherein the network slice subnet template comprises a node descriptor of a network function node comprised in the network slice subnet, a network connection point descriptor of the network function node, a service access point descriptor of the network function node and connection description information between the network function nodes; wherein the connection description information between the network function nodes comprises a network connection descriptor between the network function nodes and a service connection descriptor between the network function nodes; the node descriptor of the network function node is used to describe information required for network function subnet instantiation; the network connection point descriptor of the network function node is used to describe network connection point information of the network function node; the service access point descriptor of the network function node is used to describe service access point information of the network function node; the network connection descriptor between the network function nodes is used to describe network connection information between the network function nodes; and the service connection descriptor between the network function nodes is used to describe service connection information between the network function nodes.

9. The method according to claim 7, wherein the network slice subnet template further comprises a network service descriptor index file corresponding to a virtualized network function comprised in the network slice subnet, and the network service descriptor index file is used for instantiating a virtual resource deployment of the virtualized network function.

10. The method according to claim 7, wherein the network slice subnet instantiation request further comprises a deployment area of the network slice subnet instance, and the network service instantiation request further comprises the deployment area of the network slice subnet instance.

11. The method according to claim 7, wherein the network slice subnet requirement information comprises a network slice subnet template identifier or a network slice type; and
the obtaining, by the network slice subnet management function entity, network slice subnet template comprises:
obtaining, by the network slice subnet management function entity, the network slice subnet template based on the network slice subnet template identifier or the network slice type.

12. A network slice management function entity, comprising a processor, a transceiver, and a memory, wherein the memory stores a set of program code, and the processor is configured to invoke the program code stored in the memory, to perform the following operations:
receiving a network slice instantiation request, wherein the network slice instantiation request comprises network slice requirement information, and the network slice requirement information comprises a network slice template identifier or a network slice type, and network slice deployment requirement information;
obtaining a network slice template based on the network slice template identifier or the network slice type;
decomposing, by the network slice management function entity based on the network slice template, the network slice requirement information into network slice subnet requirement information of a network slice subnet comprised in the network slice template and transport network requirement information in the network slice;
for each network slice subnet comprised in the network slice, sending a network slice subnet instantiation request to a network slice subnet management function entity, wherein the network slice subnet instantiation request comprises the network slice subnet requirement information;
receiving a network slice subnet instantiation response sent by the network slice subnet management function entity, wherein the network slice subnet instantiation response comprises network slice subnet instantiation information, and the network slice subnet instantiation information comprises a network slice subnet instance identifier, service access point instantiation information of a network slice subnet instance, and network connection point instantiation information of the network slice subnet instance;
sending a transport network instantiation request to a transport network manager, wherein the transport network instantiation request comprises the transport network requirement information in the network slice and network connection point information of all network slice subnet instances; and
triggering an establishment of a service connection of each network slice subnet instance based on service access point information obtained after instantiation of each network slice subnet.

13. The network slice management function entity according to claim 12,
wherein the network slice template comprises a network slice subnet template identifier, a network connection point descriptor of a network slice subnet node, a service access point descriptor of the network slice subnet node, a network connection descriptor between network slice subnet nodes, and a service connection descriptor between the network slice subnet nodes;

wherein the network connection point descriptor of the network slice subnet node is used to describe network connection point information of the network slice subnet node; the service access point descriptor of the network slice subnet node is used to describe service access point information of the network slice subnet node; the network connection descriptor between the network slice subnet nodes is used to describe network connection information between the network slice subnet nodes; and the service connection descriptor between the network slice subnet nodes is used to describe service connection information between the network slice subnet nodes.

14. The network slice management function entity according to claim 12, wherein the network slice subnet instantiation request further comprises a deployment area of the network slice subnet instance, and the network slice subnet instance is an instance corresponding to the network slice subnet; the operations further comprising:
  determining the deployment area of the network slice subnet instance based on the network slice requirement information.

15. The network slice management function entity according to claim 12, wherein the network slice subnet requirement information further comprises the network slice subnet template identifier or the network slice type.

16. The network slice management function entity according to claim 12, wherein the operation of triggering the establishment of the service connection of each network slice subnet instance comprises:
  sending a service access request to a corresponding network slice subnet management function entity based on the service access point information obtained after the instantiation of each network slice subnet, wherein the service access request comprises a network slice instance identifier, a corresponding network slice subnet template identifier, and corresponding service access point information, and the service access request is used to trigger a corresponding network slice subnet association function entity to establish the service connection.

17. A network slice subnet management function entity, comprising a processor, a transceiver, and a memory, wherein the memory stores a set of program code, and the processor is configured to invoke the program code stored in the memory, to perform the following operations:
  receiving a network slice subnet instantiation request, wherein the network slice subnet instantiation request comprises network slice subnet requirement information;
  obtaining a network slice subnet template;
  decomposing, based on the network slice subnet template, the network slice subnet requirement information into network service requirement information of a network function comprised in the network slice subnet template, service configuration requirement information, and transport network requirement information in a network slice subnet;
  sending a network slice subnet instantiation response to a network slice management function entity, wherein the network slice subnet instantiation response comprises network slice subnet instantiation information, and the network slice subnet instantiation information comprises a network slice subnet instance identifier, service access point instantiation information of a network slice subnet instance, and network connection point instantiation information of the network slice subnet instance;
  sending a network service instantiation request to a management and orchestration, wherein the network service instantiation request comprises the network service requirement information;
  sending a service configuration request to an element management system corresponding to the network slice subnet management function entity, wherein the service configuration request comprises the service configuration requirement information; and
  sending a transport network instantiation request to a transport network manager, wherein the transport network instantiation request comprises the transport network requirement information in the network slice subnet.

18. The network slice subnet management function entity according to claim 17, wherein the network slice subnet template comprises a node descriptor of a network function node comprised in the network slice subnet, a network connection point descriptor of the network function node, a service access point descriptor of the network function node and connection description information between the network function nodes; wherein the connection description information between the network function nodes comprises a network connection descriptor between the network function nodes and a service connection descriptor between the network function nodes; the node descriptor of the network function node is used to describe information required for network function subnet instantiation; the network connection point descriptor of the network function node is used to describe network connection point information of the network function node; the service access point descriptor of the network function node is used to describe service access point information of the network function node; the network connection descriptor between the network function nodes is used to describe network connection information between the network function nodes; and the service connection descriptor between the network function nodes is used to describe service connection information between the network function nodes.

19. The network slice subnet management function entity according to claim 17, wherein the network slice subnet requirement information comprises a network slice subnet template identifier or a network slice type; and the operation of obtaining the network slice subnet template comprises:
  obtaining the network slice subnet template based on the network slice subnet template identifier or the network slice type.

* * * * *